(12) United States Patent
Qi

(10) Patent No.: US 12,429,709 B2
(45) Date of Patent: Sep. 30, 2025

(54) EYEGLASS LENS

(71) Applicant: HOYA LENS THAILAND LTD., Pathumthani (TH)

(72) Inventor: Hua Qi, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 442 days.

(21) Appl. No.: 17/924,586

(22) PCT Filed: Feb. 25, 2021

(86) PCT No.: PCT/JP2021/006984
§ 371 (c)(1),
(2) Date: Nov. 10, 2022

(87) PCT Pub. No.: WO2021/229889
PCT Pub. Date: Nov. 18, 2021

(65) Prior Publication Data
US 2023/0229018 A1   Jul. 20, 2023

(30) Foreign Application Priority Data
May 14, 2020   (JP) ................................ 2020-085298

(51) Int. Cl.
*G02C 7/02* (2006.01)
(52) U.S. Cl.
CPC ......... *G02C 7/022* (2013.01); *G02C 2202/24* (2013.01)
(58) Field of Classification Search
CPC ....... G02C 7/022; G02C 7/06; G02C 2202/24
(Continued)

(56) References Cited

U.S. PATENT DOCUMENTS

| | | | | |
|---|---|---|---|---|
| 2006/0082729 | A1* | 4/2006 | To | G02B 5/1895 351/159.06 |
| 2013/0010255 | A1* | 1/2013 | Holden | G02C 7/042 351/159.79 |

(Continued)

FOREIGN PATENT DOCUMENTS

| | | |
|---|---|---|
| JP | 2020500328 A | 1/2020 |
| WO | 2019166653 A1 | 9/2019 |

(Continued)

OTHER PUBLICATIONS

PCT/JP2021/006984, "English Translation of International Search Report", May 18, 2021, 4 pages.

(Continued)

*Primary Examiner* — William R Alexander

(57) ABSTRACT

The present invention provides an eyeglass lens and its related techniques, the eyeglass lens including: a base region that causes a luminous flux that has entered from an object-side face to exit from an eyeball-side face, and to enter an eye and converge on a retina; and a plurality of defocus regions that are in contact with the base region and that are each configured such that a luminous flux that passes through at least a part of the corresponding defocus region enters the retina as diverging light, in which a defocus spot angle (DSA) of the luminous flux that causes a light spot having a size mainly for cones is set in a defocus region located near the center of the eyeglass lens, and a defocus spot angle (DSA) of the luminous flux that causes a light spot having a size mainly for rods is set in a defocus region located near the periphery of the eyeglass lens.

14 Claims, 14 Drawing Sheets

(58) Field of Classification Search
USPC .................................................. 351/159.79
See application file for complete search history.

(56) References Cited

U.S. PATENT DOCUMENTS

| | | | |
|---|---|---|---|
| 2014/0132914 A1* | 5/2014 | Holden .................... | G02C 7/04 |
| | | | 351/159.02 |
| 2017/0131567 A1 | 5/2017 | To et al. | |
| 2018/0275427 A1 | 9/2018 | Lau et al. | |
| 2019/0033619 A1 | 1/2019 | Neitz et al. | |
| 2020/0073147 A1 | 3/2020 | Chandra et al. | |
| 2020/0089023 A1* | 3/2020 | Zhou ....................... | G02C 11/10 |
| 2021/0048690 A1* | 2/2021 | Guillot .................... | G02C 7/086 |
| 2021/0116720 A1* | 4/2021 | Guillot .................... | G02C 7/06 |

FOREIGN PATENT DOCUMENTS

| | | | |
|---|---|---|---|
| WO | 2020261213 | A1 | 12/2020 |
| WO | 2021198362 | A1 | 10/2021 |

OTHER PUBLICATIONS

EP21804754.6, "Extended European Search Report", May 3, 2024, 11 pages.
PCT/JP2021/006984, "International Preliminary Report on Patentability", Nov. 24, 2022, 7 pages.

* cited by examiner

Example 4
Ring 2

EYEGLASS LENS

CROSS-REFERENCE TO RELATED APPLICATIONS

This application is the National Stage of International Application No. PCT/JP2021/006984, filed Feb. 25, 2021, which claims priority to Japanese Patent Application No. 2020-085298, filed May 14, 2020, the contents of which is incorporated by reference.

TECHNICAL FIELD

The present disclosure relates to an eyeglass lens.

BACKGROUND ART

There are eyeglass lenses for suppressing the progression of a refractive error such as myopia, in which a plurality of island-shaped regions whose refractive power is more positive than a prescription power are provided on the lenses (see Patent Document 1, for example). Hereinafter, an "island-shaped region" is referred to as a "defocus region". According to eyeglass lenses with this configuration, although a luminous flux that enters a lens from an object-side face and exits from an eyeball-side face is focused on the wearer's retina in principle, a luminous flux that passes through the defocus regions is focused at a position located forward of the retina, thus suppressing the progression of myopia.

In this specification, the forward direction where an object that is to be viewed is present in the direction of an optical axis is referred to as a front side, and a direction that is opposite to the front side, and a rear side in the direction of an optical axis, i.e., a direction of moving from the eyeglass lens toward the eyeball, is referred to as a back side.

CITATION LIST

Patent Documents

Patent Document 1: U.S. Patent Application Publication No. 2017/0131567

SUMMARY OF DISCLOSURE

Technical Problem

The inventors of the present disclosure found the present disclosure based on the following novel viewpoints.

FIG. 1 is a graph in which the number of rod and cone cells per mm$^2$ on the retina is plotted on the vertical axis, and the visual angle (unit: degrees) is plotted on the horizontal axis.

Cells that correspond to optical sensors are distributed on the retina. The cells that correspond to optical sensors are not evenly distributed on the retina. Cone cells are distributed in a foveal portion on the retina, and rod cells are distributed in a peripheral edge portion distanced from the foveal portion, for example.

The cones, which are mainly distributed in the foveal portion, are sensitive to smaller sized light spots. The rods, which are mainly distributed in the peripheral edge portion, are sensitive to larger sized light spots. That is, it is conceivable that the foveal portion and the peripheral edge portion of the retina have different sensitivities to changes in light spots due to the difference in distribution between cones and rods.

It is an aspect of an embodiment of the present disclosure to provide a technique for suppressing the progression of myopia utilizing the distribution of cells on the retina.

Solution to Problem

FIG. 2 is a schematic diagram showing a state in which, when an object is viewed through a center portion of an eyeglass lens, light that has passed through the center portion of the eyeglass lens reaches the foveal portion of the retina, and light that has passed through a peripheral portion of the eyeglass lens reaches the peripheral edge portion of the retina.

Cone cells are distributed in the foveal portion of the retina, and rod cells are distributed in the peripheral edge portion of the retina distanced from the foveal portion, for example. Also, as shown in FIG. 2, the light that reaches the foveal portion of the retina mainly passes though the center portion of the eyeglass lens, and the light that reaches the peripheral edge portion of the retina mainly passes through the peripheral portion of the eyeglass lens.

That is, a configuration in which comparatively small light spots occur is adopted in consideration of the cone cells mainly receiving light from a defocus region provided in the center portion of the eyeglass lens. A configuration in which comparatively large light spots occur is adopted in consideration of the rod cells mainly receiving light from a defocus region provided in the peripheral portion of the eyeglass lens.

The following aspects were arrived at based on the above findings.

A first aspect of the present disclosure is directed to an eyeglass lens including:
- a base region that causes a luminous flux that has entered from an object-side face to exit from an eyeball-side face, and to enter an eye and converge on a retina; and
- a plurality of defocus regions that are in contact with the base region and that are each configured such that a luminous flux that passes through at least a part of the corresponding defocus region enters the retina as diverging light,
- in which a defocus spot angle (DSA) of the luminous flux that causes a light spot having a size mainly for cones is set in a defocus region located near the center of the eyeglass lens, and a defocus spot angle (DSA) of the luminous flux that causes a light spot having a size mainly for rods is set in a defocus region located near a periphery of the eyeglass lens.

A second aspect of the present disclosure is directed to the eyeglass lens according to the first aspect,
- in which the DSA of the defocus regions increases in a direction from a center portion of the eyeglass lens toward a peripheral portion of the eyeglass lens.

A third aspect of the present disclosure is directed to the eyeglass lens according to the first or second aspect,
- in which the DSA of the defocus regions changes in a range of 5.0 to 50.0 arcmin in a direction from a center portion of the eyeglass lens toward a peripheral portion of the eyeglass lens.

A fourth aspect of the present disclosure is directed to the eyeglass lens according to any one of the first to third aspects,
- in which defocus powers at the centers of 80% or more of all of the defocus regions are equal to each other on the eyeglass lens, and the defocus regions increase in size from a center portion of the eyeglass lens toward a peripheral portion of the eyeglass lens.

A fifth aspect of the present disclosure is directed to the eyeglass lens according to any one of the first to third aspects,
in which the sizes of 80% or more of all of the defocus regions are equal to each other on the eyeglass lens, and defocus powers increase from a center portion of the eyeglass lens toward a peripheral portion of the eyeglass lens.

A sixth aspect of the present disclosure is directed to the eyeglass lens according to any one of the first to fifth aspects,
in which at least one of all of the defocus regions is rotationally symmetric about an axis, and
a refractive power increases from a center portion toward a peripheral portion in the at least one defocus region that is rotationally symmetric about an axis.

A seventh aspect of the present disclosure is directed to the eyeglass lens according to any one of the first to sixth aspects,
in which refractive powers at center portions of 80% or more of all of the defocus regions are equal to each other.

An eighth aspect of the present disclosure is directed to the eyeglass lens according to any one of the first to seventh aspects,
in which the eyeglass lens is a myopia progression suppressing lens.

A ninth aspect of the present disclosure is directed to an eyeglass lens including:
a base region that causes a luminous flux that has entered from an object-side face to exit from an eyeball-side face, and to enter an eye and converge on a retina; and
a plurality of defocus regions that are in contact with the base region and that are each configured such that a luminous flux that passes through at least a part of the corresponding defocus region enters the retina as diverging light,
in which the defocus regions increase in size from a center portion of the eyeglass lens toward a peripheral portion of the eyeglass lens.

Preferably, defocus powers at the center portions of 80% or more of all of the defocus regions are equal to each other on the eyeglass lens.

Other aspects of the present disclosure that can be combined with the above-described aspects are as follows.

Examples of the arrangement of the defocus regions in a plan view include an arrangement in which they are independently and discretely arranged such that the centers of the convex regions respectively match vertices of an equilateral triangle (the centers of the defocus regions are respectively arranged at vertices of a honeycomb structure).

When the DSA of each defocus region is increased in the direction from the center portion of the eyeglass lens toward the peripheral portion of the eyeglass lens, it is preferable to determine the DSA as a function of the distance from the center of the eyeglass lens to a predetermined position of the defocus region, as a variable. It is conceivable that this function is a continuous monotonically increasing function, a stepwise increasing function such as a step function, or a combination thereof. Although there is no limitation on the amount of an increase in the DSA, the amount of an increase in the DSA may be in a range of 5.0 to 50.0 arcmin, and preferably in a range of 8.0 to 30.0.

Although there is no limitation on the number and the shape of sections, the number of sections where the defocus regions are provided is preferably two to four, and the sections preferably have a concentric or concentric elliptical shape, as will be described in the section "Examples".

However, in the present disclosure, the DSA of each defocus region increase gradually in the direction from the center portion of the eyeglass lens toward the peripheral portion of the eyeglass lens, but this does not exclude the case where the DSA of some defocus regions is reduced. In this case, it is sufficient that the average DSA value in each section increases from the center portion of the eyeglass lens toward the peripheral portion thereof.

The DSA of the defocus regions located near the center of the eyeglass lens is preferably within a range of 5.0 to 15.0 arcmin, more preferably within a range of 7.0 to 13.0 arcmin, and even more preferably within a range of 8.0 to 12.0 arcmin. Also, the DSA of the defocus region located closest to the center of the eyeglass lens is preferably within the range described in this paragraph.

The DSA of the defocus regions located near the periphery of the eyeglass lens is preferably within a range of 10.0 to 50.0 arcmin, more preferably within a range of 12.0 to 25.0 arcmin, and even more preferably within a range of 14.0 to 20.0 arcmin. Also, the DSA of the defocus region located closest to the periphery (i.e., the outermost edge of the eyeglass lens in the defocus region) is preferably within the range described in this paragraph.

The difference between the largest DSA value and the smallest DSA value in the defocus region is preferably 4.0 to 10.0 arcmin, and more preferably 5.0 to 9.0 arcmin. When the difference therebetween is within this range, it is possible to reduce a sense of unnaturalness caused by an excessively large difference in the DSA.

The average DSA of all of the defocus regions is preferably 10.0 to 14.0 arcmin, and more preferably 11.0 to 13.0 arcmin.

When sections 1 to 3 provided with defocus regions are to be formed concentrically, out of the sections provided with the defocus regions, in the annular section 1 that is closest to the center of the eyeglass lens (e.g., a centering center) and located 4.50 to 9.75 mm from the center, the DSA or the average DSA value of the defocus regions in the section 1 is preferably within a range of 5.0 to 15.0 arcmin, more preferably within a range of 7.0 to 13.0 arcmin, and even more preferably within a range of 8.0 to 12.0 arcmin. In this case, when defocus regions are formed in a space that is located inward of the section 1 and includes the center of the eyeglass lens, the DSA or the average DSA value of the defocus regions is preferably set to a lower value than the DSA or the average DSA value in the section 1.

In the annular section 2 that is adjacent to the section 1 and located 9.75 to 13.00 mm from the center, the DSA or the average DSA value of the defocus regions in the section 2 is preferably within a range of 8.0 to 30.0 arcmin, more preferably within a range of 9.0 to 20.0 arcmin, and even more preferably within a range of 10.0 to 15.0 arcmin.

In the annular section 3 that is adjacent to the section 2 and located 13.00 to 16.25 mm from the center, the DSA or the average DSA value of the defocus regions in the section 3 is preferably within a range of 9.0 to 30.0 arcmin, more preferably within a range of 12.0 to 25.0 arcmin, and even more preferably within a range of 15.0 to 19.0 arcmin.

A value obtained by subtracting the DSA value (or the average DSA value) in the section 1 from the DSA value (or the average DSA value) in the section 2, i.e., the amount of an increase from the section 1 to the section 2, is preferably 2.5 to 5.0 arcmin, more preferably 3.0 to 5.0 arcmin, and even more preferably 3.5 to 5.0 arcmin.

A value obtained by subtracting the DSA value (or the average DSA value) in the section 2 from the DSA value (or the average DSA value) in the section 3, i.e., the amount of an increase from the section 2 to the section 3, is preferably 2.5 to 5.0 arcmin, more preferably 3.0 to 5.0 arcmin, and even more preferably 3.5 to 5.0 arcmin.

In the Examples described later, the defocus regions in the sections have the same shape. However, the present disclosure is not limited to this aspect. The defocus regions in the 4.50 to 9.75 mm annular section 1 need not have the same shape, for example. The boundaries between sections may be present within a range of 13.00 to 16.25 mm from the center, for example, and the boundaries between sections can be set as appropriate. In this case as well, in each section, it is preferable that the average DSA value falls within the above numerical range.

As will be described in Example 1 later, on the eyeglass lens, the fluctuation range of defocus powers in 80% or more (preferably 90% or more, more preferably 95% or more, even more preferably 99% or more, and particularly preferably 100%) of all of the defocus regions is within ±10% (preferably within ±5%, and more preferably within ±1%), whereas the defocus regions may be increased in size (diameter) from the center portion of the eyeglass lens toward the peripheral portion thereof. Although there is no limitation on specific numerical values of the diameter, the smallest diameter of the defocus regions on the eyeglass lens is preferably within a range of 0.5 to 1.0 mm, and the largest diameter thereof is preferably within a range of 0.8 to 1.3 mm. The difference between the largest value and the smallest value is preferably within a range of 0.3 to 0.6 mm.

As will be described in Example 2 later, on the eyeglass lens, the fluctuation range of the sizes in 80% or more (preferably 90% or more, more preferably 95% or more, even more preferably 99% or more, and particularly preferably 100%) of all of the defocus regions is within ±10% (preferably within ±5%, and more preferably within ±1%), whereas the defocus power may be increased from the center portion of the eyeglass lens toward the peripheral portion thereof. Although there is no limitation on specific numerical values of the defocus power, it is preferable that the smallest value of the defocus powers provided by the defocus regions on the eyeglass lens is within a range of 1.5 to 4.5 D [unit: diopters], and the largest value thereof is within a range of 3.0 to 10.0 $D_{eye}$. The difference between the largest value and the smallest value is preferably within a range of 1.0 to 5.0 D.

The fluctuation range of the refractive powers at the center portions of the defocus regions is preferably within ±10% (preferably within ±5%, and more preferably within ±1%). Note that values falling within the above fluctuation range described in this specification are, but not limited to the description in this paragraph, "equal" or "constant". When the fluctuation range is a positive value, the fluctuation range may be 100×(the largest value−the smallest value)/the largest value.

A profile power plot of the defocus region having a rotationally symmetric shape about an axis (the vertical axis: DSA [arcmin], the horizontal axis: the radial position [mm] from the center portion of the defocus region) may be continuous as in Examples 3 and 4, or may be discontinuous as in Example 5. Also, if the profile curve is continuous, the profile power plot may be represented by one mathematical expression as in Example 3, or may be represented by a plurality of mathematical expressions as in Example 4.

Advantageous Effects of Disclosure

According to an embodiment of the present disclosure, it is possible to provide a technique for suppressing the progression of myopia utilizing the distribution of cells on the retina.

DESCRIPTION OF EMBODIMENTS

Figure 1:
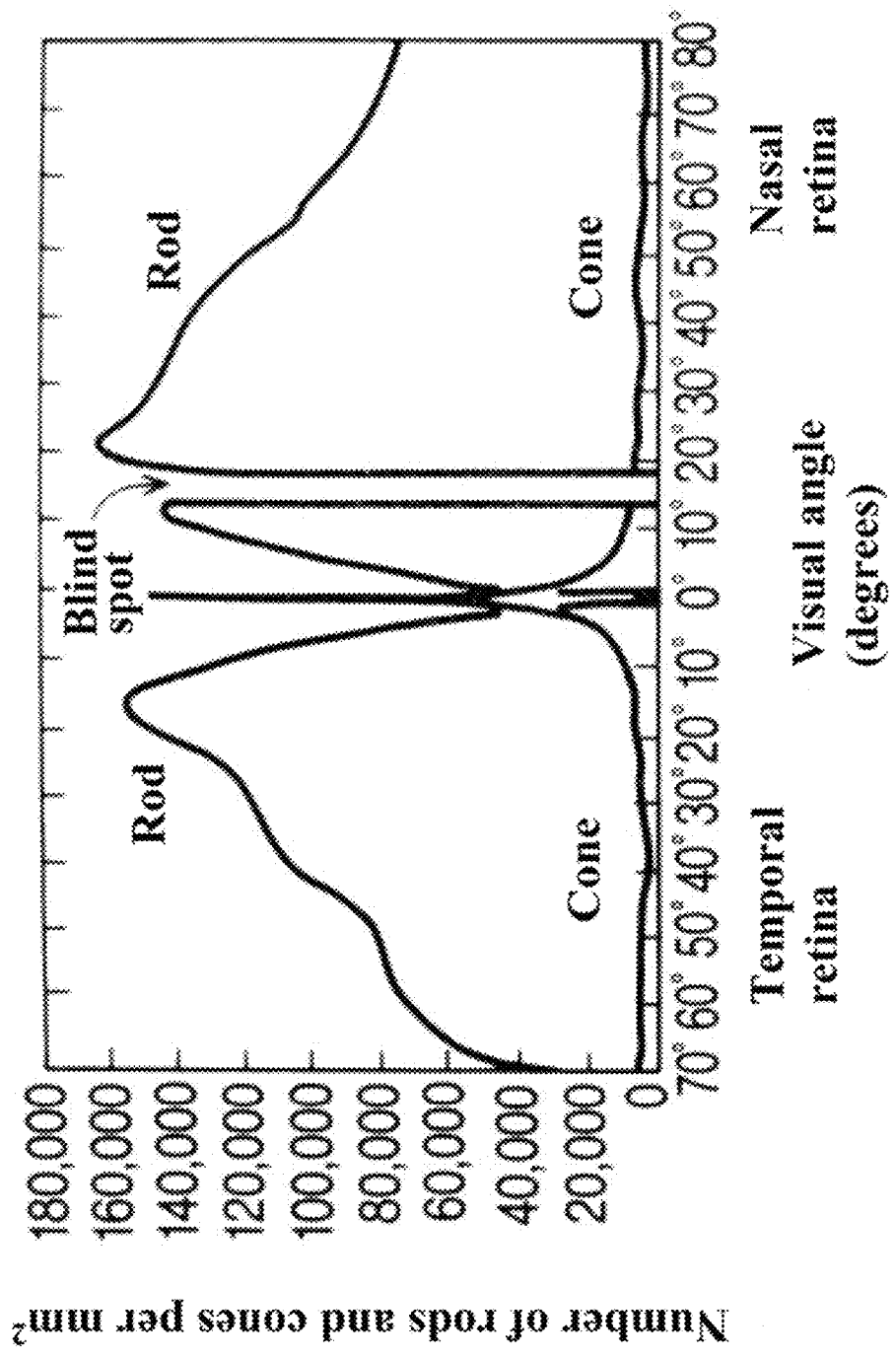
FIG. 1 is a graph in which the number of rod and cone cells per $mm^2$ on the retina is plotted on the vertical axis, and the visual angle (unit: degrees) is plotted on the horizontal axis.
Figure 2:
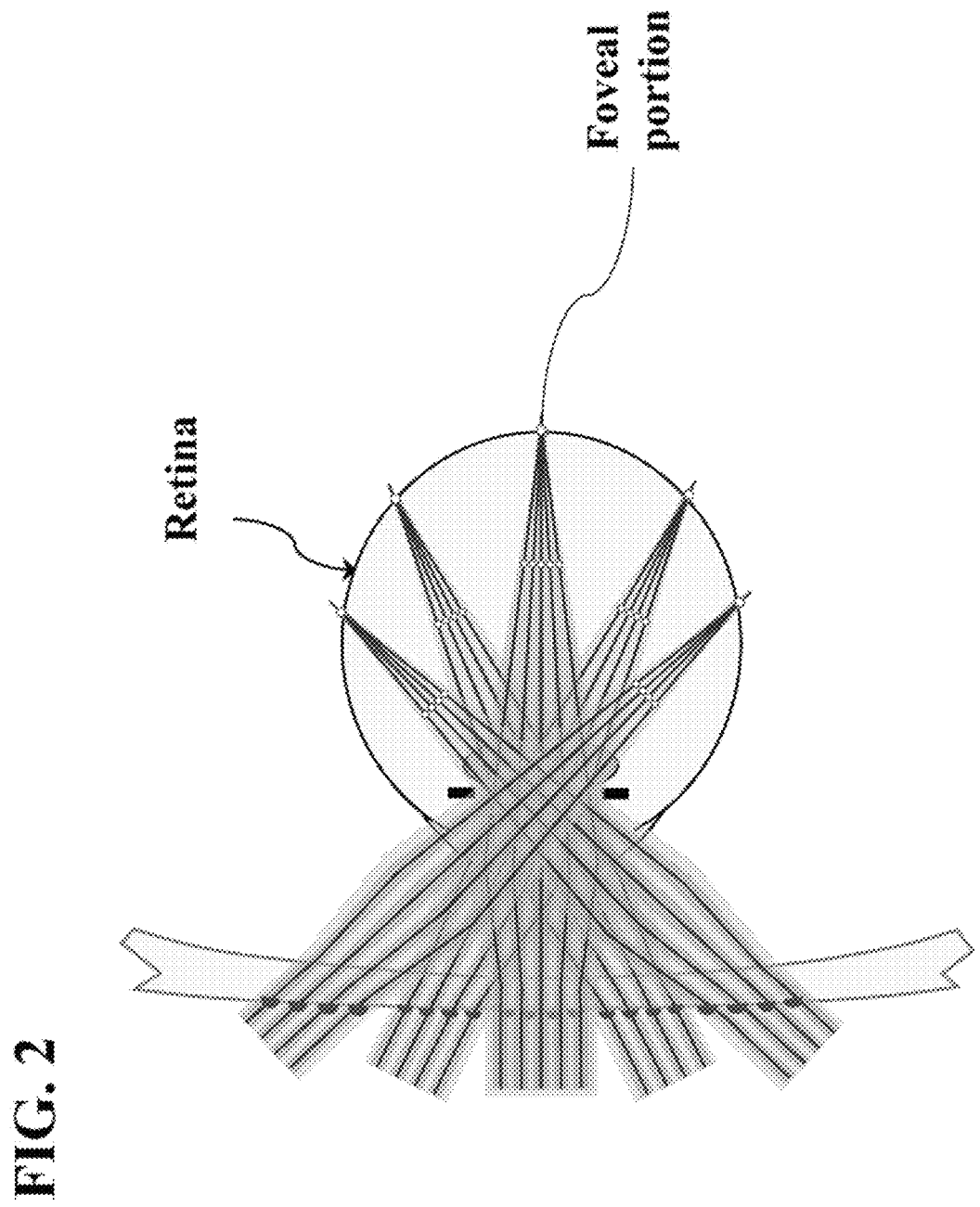
FIG. 2 is a schematic diagram showing a state in which, when an object is viewed through a center portion of an eyeglass lens, light that has passed through the center portion of the eyeglass lens reaches the foveal portion of the retina, and light that has passed through a peripheral portion of the eyeglass lens reaches the peripheral edge portion of the retina.

Hereinafter, an embodiment of the present disclosure will be described. The description based on the drawings in the following is illustrative, and the present disclosure is not limited to the illustrated aspects. The contents not described in this specification are those described in Patent Document 1, and the contents not described in Patent Document 1 (especially the contents relating to the production method) are those described in WO2020/004551 ("WO document"). If there is any discrepancy between the contents of the description in Patent Document 1 and the description in the WO document, priority is given to the description in the WO document.

The eyeglass lens referred to in this specification has an object-side face and an eyeball-side face. The "object-side face" is a surface that is located on the object side when a wearer wears a pair of glasses including the eyeglass lens, and the "eyeball-side face" is a surface that is located on the opposite side, that is, the eyeball side when the wearer wears the pair of glasses including the eyeglass lens. This relationship also applies to a lens substrate, which forms the base of the eyeglass lens. That is, the lens substrate also has an object-side face and an eyeball-side face.

In this specification, "to" in relation to values refers to a predetermined value or more and a predetermined value or less.

<Eyeglass Lens>

An aspect of the present disclosure is directed to the following eyeglass lens.

"An eyeglass lens including:
 a base region that causes a luminous flux that has entered from an object-side face to exit from an eyeball-side face, and to enter an eye and converge on a retina; and
 a plurality of defocus regions that are in contact with the base region and that are each configured such that a luminous flux that passes through at least a part of the corresponding defocus region enters the retina as diverging light,
 in which a defocus spot angle (DSA) of the luminous flux that causes a light spot having a size mainly for cones is set in a defocus region located near the center of the eyeglass lens, and a defocus spot angle (DSA) of the luminous flux that causes a light spot having a size mainly for rods is set in a defocus region located near a periphery of the eyeglass lens."

The base region is a portion with a shape that can realize the prescription power of a wearer, and corresponds to the first refractive region in Patent Document 1.

Each of the defocus regions is a region in which at least a part thereof does not allow light to be focused at a focus position of the base region. The defocus regions are portions corresponding to the micro-convex portions in Patent Document 1. As with the eyeglass lens described in Patent Document 1, the eyeglass lens according to an aspect of the present disclosure is a myopia progression suppressing lens. As with the micro-convex portions in Patent Document 1, it is sufficient that the plurality of defocus regions according to an aspect of the present disclosure are formed on at least one of the object-side face and the eyeball-side face of the eyeglass lens. In this specification, a case in which the plurality of defocus regions are formed only on the object-side face of the eyeglass lens will be mainly described as an example.

Each defocus region according to an aspect of the present disclosure is configured such that a luminous flux that passes through at least a part thereof enters the retina as diverging light. The "diverging light" is a diverging luminous flux (a luminous flux having a divergent wavefront). The diverging luminous flux will be described later in "Findings leading to the Present Disclosure".

A defocus spot angle of a light spot in a visual field in this specification is an index that indicates, in terms of a visual angle [unit: arcmin], the size of a light spot generated on the retina by light passing through a defocus region. Hereinafter, the defocus spot angle is abbreviated as "DSA". The DSA is also referred to as the "spread angle" of a luminous flux. In this specification, a large DSA means a large light spot.

In an aspect of the present disclosure, a DSA is set so as to provide light spots having a size mainly for cones in a defocus region located near the center of the eyeglass lens.

Figure 10:
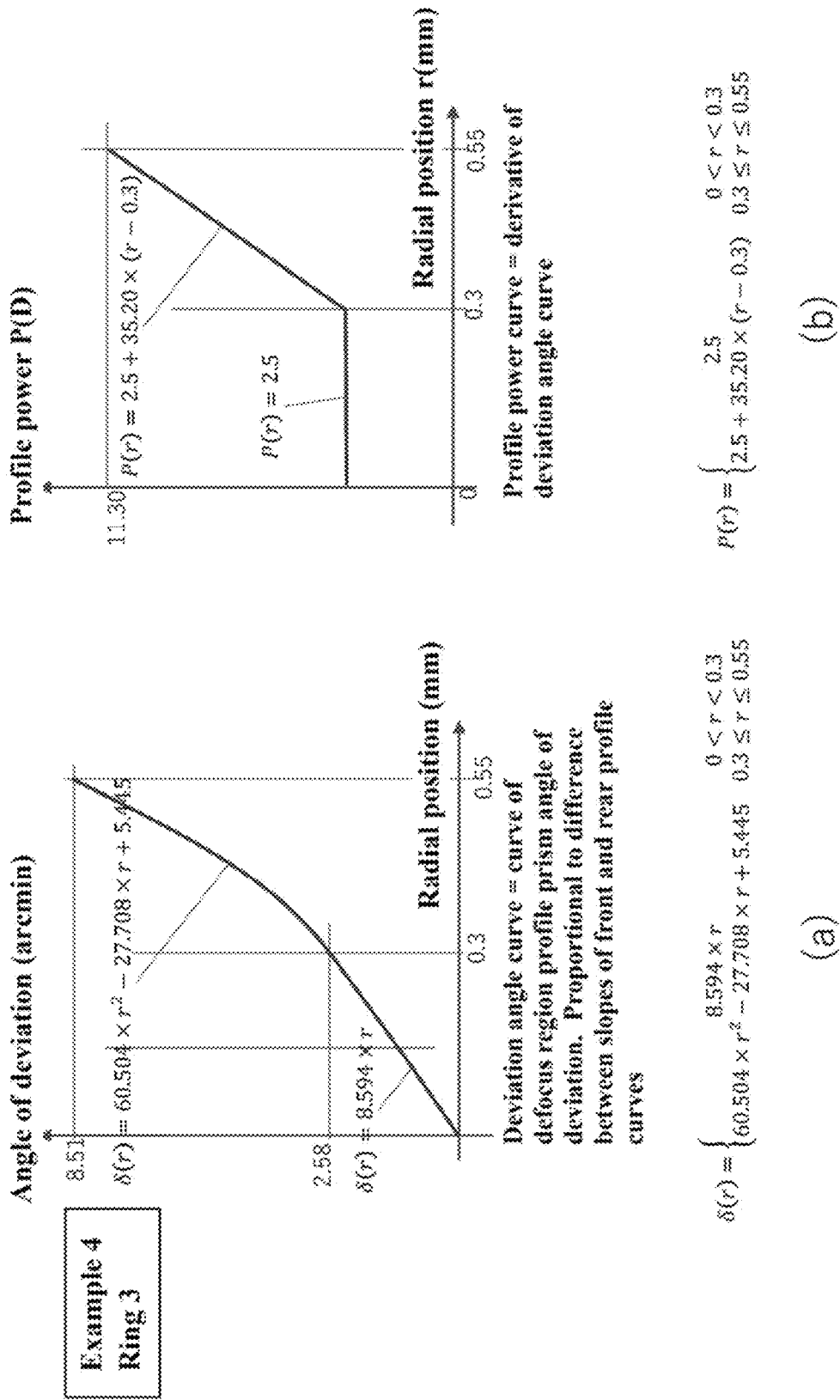
FIG. 10(a) is a graph in which the radial position r [mm] from the center portion of a defocus region of a ring 3 in Example 4 is plotted on the X axis, and the prism angle of deviation δ [arcmin] is plotted on the Y axis.
FIG. 10(b) is a graph in which the radial position r [mm] from the center portion of a defocus region of the ring 3 in Example 4 is plotted on the X axis, and the profile power P [D] is plotted on the Y axis.

As illustrated in FIG. 10 in Patent Document 1, if a defocus region is to be formed in a center portion of the eyeglass lens, the DSA is set so as to provide light spots having a size mainly for cones in the defocus region.

On the other hand, as illustrated in FIG. 1 in Patent Document 1, if no defocus region is to be formed in the center portion of the eyeglass lens, the DSA is set so as to provide light spots having a size mainly for cones in a defocus region that is formed in a peripheral portion of the eyeglass lens and is relatively close to the center portion.

The "center portion of the eyeglass lens" refers to the geometric center, the optical center, or the centering center of the eyeglass lens, and the vicinities thereof. In this specification, the case where the center portion of the eyeglass lens refers to the centering center and the vicinity thereof will be described as an example.

The expression "defocus region located near the center of the eyeglass lens" is used in order to encompass the geometric center, the optical center, the centering center, and the vicinities thereof.

Furthermore, in an aspect of the present disclosure, the DSA is set so as to mainly provide light spots having a size for rods in a defocus region located near the periphery of the eyeglass lens.

The wording "near the periphery of the eyeglass lens" refers to the outer peripheral side of the eyeglass lens relative to the center of the eyeglass lens.

In an aspect of the present disclosure, a "light spot having a size mainly for cones" is larger than a "light spot having a size mainly for rods". That is, the DSA that causes a light spot having a size mainly for cones, is smaller than the DSA that causes a light spot having a size mainly for rods. There is no limitation on the size of light spots and there is no limitation on the DSA values as long as this condition is satisfied. Preferred examples of DSA values will be described later.

As shown in FIG. 1, the wording "mainly for cones" is an expression used taking into consideration that not only cones but also rods are present in the foveal portion. The wording "mainly for rods" is also an expression given the same consideration.

According to an aspect of the present disclosure, it is possible to provide a technique for suppressing the progression of myopia utilizing the distribution of cells on the retina. It is possible to delay the progression of myopia by fully utilizing cone cells and rod cells of the retina and effectively inhibit eyeball growth.

<Preferred Examples and Modified Examples of Eyeglass Lens>

Hereinafter, preferred examples and modified examples of the eyeglass lens according to an aspect of the present disclosure will be described. In particular, the DSA will be described in detail. The findings leading up to the present disclosure will be described before describing the DSA.

(Findings Leading to the Present Disclosure)

The invention described in Patent Document 1 suppresses myopia progression by causing a luminous flux that passes through a plurality of defocus regions, which are second refractive regions, to be focused in front of a retina. The inventor of the present disclosure re-examined the mechanism by which the invention described in Patent Document 1 exhibits the myopia progression suppressing effect.

The term "focusing" used in this specification is not necessarily limited to focusing in a narrow sense, in which substantially non-aberrant light is collected at one point, and also encompasses focusing in a broad sense, such as focusing light at a position at which a diffractive lens has high flare light density.

Understanding the mechanism of myopia progression is a shortcut to understanding the mechanism of the myopia progression suppressing effect.

As a mechanism of myopia progression in childhood, it is said that whether the position of an image (focus position) is located in front of or behind a retina determines whether eyeball growth is suppressed or facilitated. When an image is constantly formed behind the retina, eyeball growth is facilitated to cause the image to appear on the retina. When the image is constantly formed in front of the retina, the eyeball growth is inhibited to cause the image to appear on the retina. The state in which an image is constantly formed behind the retina is caused by a child being near-sighted for an extended period of time, and insufficient accommodation (the occurrence of accommodative lag). The invention described in Patent Document 1 aims to cause a portion of light entering an eye to be focused in front of the retina and suppress eyeball growth.

Although the above cones, rods, and the like on the retina are known as mechanisms for sensing light, it seems that eyes do not have a mechanism for directly detecting whether the image of a viewed object is formed behind or in front of the retina. In this case, humans most likely use some other kind of mechanism for detecting the position of an image.

One conceivable possibility for this mechanism is detecting a change in a light spot on the retina using accommodative microfluctuations. The term "light spot" in this specification refers to a distribution of light on the retina formed as a result of light from an object point passing through part of an eyeglass lens and the eye's optical system. The light spot appears as a single point when in focus, and appears as a light distribution of a certain size when not in focus (defocused).

When the image is formed behind the retina, for example, a luminous flux from an object enters the retina as a converging luminous flux. When the accommodative power of the crystalline lens in the eyeball is reduced (the ciliary body is relaxed and the crystalline lens is thin), the image moves further rearward, and the size of a light spot on the retina increases. On the other hand, when the accommodative power is increased (the ciliary body is contracted and the crystalline lens is thick), the size of a light spot on the retina decreases. It seems that there is a mechanism in which a change in the size of a light spot caused by accommodative microfluctuations is detected by the optic nerve or through subsequent cortical information processing, and a signal for facilitating eyeball growth is output, and thus myopia progresses.

Another possibility for the mechanism for detecting a change in an image on a retina is to detect the light intensity density of a light spot.

If the intensity of light emitted is constant, the smaller the area of the light spot is, the greater the light intensity density is. When the accommodative power of the crystalline lens in the eyeball is reduced, the image further moves rearward, and the light intensity density of the light spot on the retina decreases. On the other hand, when the accommodative power is increased, the light intensity density of the light spot on the retina increases. It seems that there is a mechanism in which a change in the light intensity density of a light spot caused by accommodative microfluctuations is detected by the optic nerve or through subsequent cortical information processing, and a signal for facilitating eyeball growth is output, and thus myopia progresses.

Regardless of the mechanism, the mechanism of the invention described in Patent Document 1 suppresses myopia progression by using perception of a change in the size of a light spot formed on a retina by light from an object point (or a change in the light intensity density) caused by accommodative microfluctuations of an eyeball. That is to say, the larger the amount of change in the light spot size or the amount of change in the light intensity density per predetermined eye's accommodative amount, the greater the myopia progression suppressing effect (viewpoint 1).

As illustrated in the description of accommodative microfluctuations above, when the image is formed behind the retina, a luminous flux from an object enters the retina as a converging luminous flux. A wavefront of light formed by the converging luminous flux is referred to as a convergent wavefront. That is to say, according to the above-described accommodative lag, myopia progresses when a wavefront that enters the retina is a convergent wavefront.

In that case, it is possible to suppresses myopia progression by providing a situation in which a divergent wavefront enters the retina, which is opposite to the above-mentioned situation (viewpoint 2). Actually, in Patent Document 1, an eyeglass lens is provided with a second refractive region, so that a luminous flux that passes through the second refractive region is caused to converge in front of a retina, at a point different from the focal point at which a luminous flux that passes through the first refractive region converges. A luminous flux that passes through the second refractive region converging in front of a retina means that a divergent wavefront enters the retina.

Based on the viewpoints 1 and 2 above, increasing the divergence degree of the diverging luminous flux in order to increase a change in the light spot size (or the light intensity density) per predetermined eye's accommodative amount while causing a diverging luminous flux to enter a retina improves the myopia progression suppressing effect. In this specification, increasing the divergence degree of the diverging luminous flux is associated with increasing the size of the light spot.

(Relationship Between Size of Light Spot and Configuration of Defocus Region)

The following describes how the size of a light spot changes depending on the configuration of a defocus region.

Figure 3:
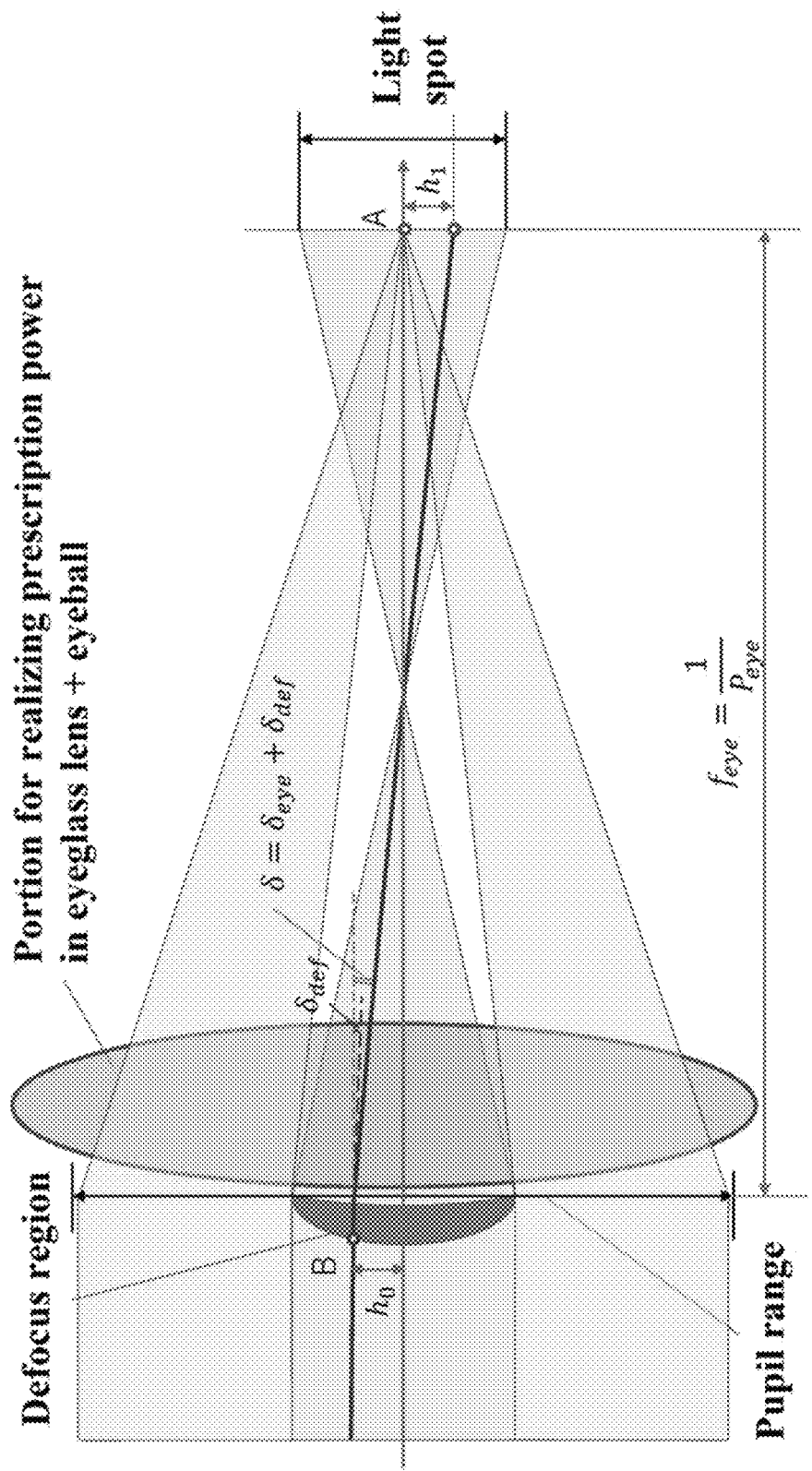
FIG. 3 is a schematic side view showing a state in which, when an eyeglass lens having a prescription power and an eyeball are collectively regarded as one optical system, an incident luminous flux from an infinitely distant object passes through one defocus region of the eyeglass lens and enters the retina.

FIG. 3 is a schematic side view showing a state in which, when an eyeglass lens having a prescription power and an eyeball are collectively regarded as one optical system, an incident luminous flux from an infinitely distant object passes through one defocus region of the eyeglass lens and enters the retina.

As shown in FIG. 3, of the incident luminous flux from an infinitely distant object, the luminous flux that passes through a base region is focused at a position A on the retina. Of the incident luminous flux, the luminous flux that passes through a defocus region is incident on the position A on the retina as diverging light, forming a light spot on the retina. A height hi of a point on the retina of light rays that enter at a height ho of the defocus region can be expressed by the following formula.

$$h_1 = h_0 + h = h_0 - \delta f_{eye} = h_0 - (\delta_{eye} + \delta_{def}) f_{eye} = -\frac{\delta_{def}}{D_{eye}} \quad \text{[Math. 1]}$$

Here, $\delta$ represents the prism angle of deviation at the height ho of the entire lens, and is the sum of the prism angle of deviation $\delta_{def}$ according to the defocus region and the prism angle of deviation $\delta_{eye}$ according to the eye optical system (the entire optical system of the eyeglass lens with the prescription power and the eyeball).

In an aspect of the present disclosure, a case where the defocus region is a convex region as described in Patent Document 1 will be described as an example. Each convex region has the function of a lens, and thus is also called a small lens.

The symbol $f_{eye}$ represents the focal length of the eye optical system, and $D_{eye}$ represents the refractive power of the eye optical system. That is, the light that has entered a defocus region forms a circular light spot on the retina, and its radius $R_{PSF}$ can be expressed using the following expression.

$$R_{PSF} = \frac{\delta_{max}}{D_{eye}} \quad \text{[Math. 2]}$$

where $\delta_{max}$ represents the maximum prism angle of deviation of the small lens, and usually refers to the prism angle of deviation at an edge portion of the small lens.

When a refractive power A for accommodation is added to the $D_{eye}$, the radius $R_{PSF}(A)$ of the light spot on the retina can be expressed by the following equation.

$$R_{PSF}(A) = \frac{\delta_{max}}{D_{eye} + A} \quad \text{[Math. 3]}$$

Further, a derivative of the radius of the light spot on the retina with respect to A can be expressed by the following expression.

$$\frac{dR_{PSF}}{dA}(0) = -\frac{\delta_{max}}{D_{eye}^2} \quad \text{[Math. 4]}$$

The slope by which the size of the light spot is reduced through accommodation is proportional to the maximum prism deviation angle $\delta_{max}$ of the small lens.

On the presumption that the small lens has a spherical shape, if the height of a small lens is sufficiently smaller than the focal length, the following equation holds true.

$$\delta_{max} = R_{def} D_{def} \quad \text{[Math. 5]}$$

where $R_{def}$ represents the radius of the small lens, and $D_{def}$ represents the refractive power of the small lens. The "radius of the small lens" refers to a radius of the part where the small lens is present when viewed in the lens thickness direction. For convenience of description, the radius of the small lens refers to the radius in a plan view.

The "refractive power" in this specification refers to the average refractive power, which is the average of the refractive power in a direction a where the refractive power is lowest and the refractive power in a direction b (the direction that is perpendicular to the direction a) where the refractive power is highest. The refractive power at the center portion is, for example, the vertex refractive power at the center in a plan view when the defocus region is a small ball-shaped segment, as with an aspect of the present disclosure.

The "defocusing power" refers to a refractive power exerted by the shape and/or the material of the defocus region, and refers to a difference between the average of defocus values at the focal positions Xthat correspond to the defocus regions, and a focus value at the focal position Y at which light rays that have passed through a portion other than the defocus regions converge and that is located on the back side relative to the plurality of focal positions X. In other words, "defocusing power" is a difference obtained by subtracting the refractive power of the base region from the average of the lowest and highest refractive powers of a given part of a defocus region (a center portion, a peripheral portion, or the entire defocus region).

Presuming that the small lens has a spherical shape, not only the defocus power of the small lens but also the size of the small lens is an important factor in the myopia progression suppressing effect as expressed by [Math. 5]. Presuming that the small lens has an aspherical shape, the maximum prism angle of deviation $\delta_{max}$ is an important factor in the myopia progression suppressing effect as expressed by [Math. 4].

In fact, humans perceive blur (so-called light spots) in a viewing angle corresponding to the maximum prism angle of deviation $\delta_{max}$. Usually, the diameter of the blur is represented by $2\delta_{max}$. Thus, the DSA in this specification is equal to double the maximum prism angle of deviation $\delta_{max}$.

As a specific example, if a small lens having a diameter of 0.5 mm and a defocus power of 3.5 D is a defocus region, the DSA will have the following value.

$$DSA=2\delta_{max}=2\times 3.5\times 0.5/1000 \text{(radian)}\sim 12 \text{ arcmin}$$

The "prism angle of deviation" used in this specification refers to the angle between the direction in which light rays enter the lens and the direction in which the light rays exit the lens.

As shown in FIG. 3, no prism is present at the center portion of the defocus region, and the light rays that exit therefrom are the same as the light rays that exit from the base lens, and reach the center of the retina. On the other hand, a prism is present in the peripheral portion of the defocus region, and light rays reach a position that is slightly displaced from the center of the retina.

As described above, the size of a light spot on the retina is determined by the maximum prism deviation angle of the defocus region. The maximum prism angle of deviation is generally determined by the prism at the edge portion of the defocus region. That is, the DSA of the defocus region is determined by the prism angle of deviation at the edge portion of the defocus region. If the defocus region is a protrusion on the surface of the lens and has a rotationally symmetric shape about an axis, the prism angle of deviation will be proportional to the slope of a profile curve of the protrusion shape. In this case, the DSA of the defocus region can be adjusted by designing the slope at an edge portion of the profile curve of the protrusion shape.

(Preferred Examples According to DSA of Defocus Region)

In a preferred example of the present disclosure, a defocus region (e.g., a small lens) located near the periphery of the eyeglass lens has a larger DSA than a defocus region (e.g., a small lens) located near the center of the eyeglass lens. This configuration can be expressed as follows.

The "DSA preferably increases in a direction from the center portion of the eyeglass lens toward the peripheral portion of the eyeglass lens".

Note that the above configuration is expressed using, as a specific configuration, the "DSA that causes a light spot having a size mainly for cones" and the "DSA that causes a light spot having a size mainly for rods" described in an aspect of the present disclosure. Therefore, the present disclosure may be expressed using the above preferred configuration instead of using the expressions described in an aspect of the present disclosure.

Also, when the DSA increases in the direction from the center portion toward the peripheral portion of the eyeglass lens, the DSA may be increased stepwise as described in the Examples, which will be described later. The eyeglass lens may be concentrically divided into sections according to the distance from the center of the eyeglass lens, and the DSA may be constant in each section while forming defocus regions having different DSA values between sections, for example. Alternatively, the DSA may be increased continuously. The expression "DSA is increased in the direction from the center portion of the eyeglass lens toward the peripheral portion of the eyeglass lens" includes both cases.

Although there is no limitation on the number and the shape of sections, the number of sections where the defocus regions are provided is preferably two to four, and the sections preferably have a concentric or concentric elliptical shape, as will be described in the section "Examples".

However, in the present disclosure, the DSA of each defocus region increases gradually in the direction from the center portion of the eyeglass lens toward the peripheral portion of the eyeglass lens, but this does not exclude the case where the DSA of some defocus regions is reduced.

In this case, it is sufficient that the average DSA value in each section increases from the center portion of the eyeglass lens toward the peripheral portion thereof.

The DSA of the defocus regions preferably changes within a range of 5.0 arcmin to 50.0 arcmin, and more preferably within a range of 8.0 arcmin to 30.0 arcmin from the center portion of the eyeglass lens toward the peripheral portion of the eyeglass lens.

When the DSA of each defocus region is increased in the direction from the center portion of the eyeglass lens toward the peripheral portion of the eyeglass lens, it is preferable to determine the DSA as a function of the distance from the center of the eyeglass lens to a predetermined position of the defocus region, as a variable. It is conceivable that this function is a continuous monotonically increasing function, a stepwise increasing function such as a step function, or a combination thereof.

If a defocus region is not formed in the center portion of the eyeglass lens, the DSA of the defocus region that is closest to the base region of the center portion is preferably set to 5.0 arcmin, and more preferably set to 8.0 arcmin.

The DSA of the defocus regions located near the center of the eyeglass lens is preferably within a range of 5.0 to 15.0 arcmin, more preferably within a range of 7.0 to 13.0 arcmin, and even more preferably within a range of 8.0 to 12.0 arcmin. Also, the DSA of the defocus region located closest to the center of the eyeglass lens is preferably within the range described in this paragraph.

The DSA of the defocus regions located near the periphery of the eyeglass lens is preferably within a range of 10.0 to 50.0 arcmin, more preferably within a range of 12.0 to 25.0 arcmin, and even more preferably within a range of 14.0 to 20.0 arcmin. Also, the DSA of the defocus region located closest to the periphery (i.e., the outermost edge of the eyeglass lens in the defocus region) is preferably within the range described in this paragraph.

The difference between the largest DSA value and the smallest DSA value in the defocus region is preferably 4.0 to 10.0 arcmin, and more preferably 5.0 to 9.0 arcmin. When the difference therebetween is within this range, it is possible to reduce a sense of unnaturalness caused by an excessively large difference in the DSA.

The average DSA of all of the defocus regions is preferably 10.0 to 14.0 arcmin, and more preferably 11.0 to 13.0 arcmin. As a result of intensive studies conducted by the inventors of the present disclosure, it was found that light spots formed at a DSA of 12.0 arcmin are effective in suppressing myopia while reducing the influence on how an object is viewed through the eyeglass lens. The range described in this paragraph is specified based on this finding.

The DSA may be specified with reference to sectioning described in the section "Examples", which will be described later. Specifically, the following specifications are preferably adopted with reference to Examples 2 to 5.

When sections 1 to 3 provided with defocus regions are to be formed concentrically, out of the sections provided with the defocus regions, in an annular section 1 that is closest to the center of the eyeglass lens (e.g., a centering center) and located 4.50 to 9.75 mm from the center, the DSA or the average DSA value of the defocus regions in the section 1 is preferably within a range of 5.0 to 15.0 arcmin, more preferably within a range of 7.0 to 13.0 arcmin, and even more preferably within a range of 8.0 to 12.0 arcmin. In this case, when defocus regions are formed in a space that is located inward of the section 1 and includes the center of the eyeglass lens, the DSA or the average DSA value of the defocus regions is preferably set to a lower value than the DSA (or the average DSA value) in the section 1.

In an annular section 2 that is adjacent to the section 1 and located 9.75 to 13.00 mm from the center, the DSA or the average DSA value of the defocus regions in the section 2 is preferably within a range of 8.0 to 30.0 arcmin, more preferably within a range of 9.0 to 20.0 arcmin, and even more preferably within a range of 10.0 to 15.0 arcmin.

In an annular section 3 that is adjacent to the section 2 and located 13.00 to 16.25 mm from the center, the DSA or the average DSA value of the defocus regions in the section 3 is preferably within a range of 9.0 to 30.0 arcmin, more preferably within a range of 12.0 to 25.0 arcmin, and even more preferably within a range of 15.0 to 19.0 arcmin.

A value obtained by subtracting the DSA value (or the average DSA value) in the section 1 from the DSA value (or the average DSA value) in the section 2, i.e., the amount of an increase from the section 1 to the section 2, is preferably 2.5 to 5.0 arcmin, more preferably 3.0 to 5.0 arcmin, and even more preferably 3.5 to 5.0 arcmin.

A value obtained by subtracting the DSA value (or the average DSA value) in the section 2 from the DSA value (or the average DSA value) in the section 3, i.e., the amount of an increase from the section 2 to the section 3, is preferably 2.5 to 5.0 arcmin, more preferably 3.0 to 5.0 arcmin, and even more preferably 3.5 to 5.0 arcmin.

In the Examples described later, the defocus regions in the sections have the same shape. Meanwhile, the present disclosure is not limited to this aspect. The defocus regions in the 4.50 to 9.75 mm annular section 1 need not have the same shape. The boundaries between sections may be present within a range of 13.00 to 16.25 mm from the center, for example, and the boundaries between sections can be set as appropriate. In this case, in each section, it is preferable that the average DSA value falls within the above numerical range.

(Preferred Examples Regarding Defocus Power Provided by Defocus Region and Size of Defocus Region)

As will be described in Example 1 later, on the eyeglass lens, the fluctuation range of the defocus powers in 80% or more (preferably 90% or more, more preferably 95% or more, even more preferably 99% or more, and particularly preferably 100%) of all of the defocus regions is within ±10% (preferably within ±5%, and more preferably within ±1%). On the other hand, each defocus region may be increased in size (diameter) from the center portion of the eyeglass lens toward the peripheral portion of the eyeglass lens. A preferred example of increasing the defocus regions (diameter) the more a defocus region located on the eyeglass lens is positioned toward the periphery of the eyeglass lens is an aspect expressed by the configuration of the present disclosure. Although there is no limitation on specific numerical values of the diameter, the smallest diameter of the defocus regions on the eyeglass lens is preferably within a range of 0.5 to 1.0 mm, and the largest diameter thereof is preferably within a range of 0.8 to 1.3 mm. The difference between the largest value and the smallest value is preferably within a range of 0.3 to 0.6 mm.

As will be described in Example 2 later, on the eyeglass lens, the fluctuation range of the sizes in 80% or more (preferably 90% or more, more preferably 95% or more, even more preferably 99% or more, and particularly preferably 100%) of all of the defocus regions is within ±10% (preferably within ±5%, and more preferably within ±1%), whereas the defocus power may be increased from the center portion of the eyeglass lens toward the peripheral portion thereof. Although there is no limitation on specific numerical values of the defocus power, it is preferable that the smallest value of the defocus power provided by the defocus regions on the eyeglass lens is within a range of 1.5 to 4.5 D [unit: diopters], and the largest value thereof is within a range of 3.0 to 10.0 D. The difference between the largest value and the smallest value is preferably within a range of 1.0 to 5.0 D.

As will be described in Examples 3 to 5 later, at least one of the defocus regions is preferably rotationally symmetric about an axis. In view of facilitating processing of the eyeglass lens, it is more preferable that defocus regions located near the center of the eyeglass lens are spherical, whereas defocus regions located near the periphery are rotationally symmetric about an axis. In this case, it is preferable to increase refractive power from the center portion of each defocus region that is rotationally symmetric about an axis toward the peripheral portion of the defocus region. Note that the "center portion" of the defocus region refers to the center of gravity in a plan view, or a vertex when the defocus region is a small lens.

The fluctuation range of the refractive powers at the center portions in 80% or more (preferably 90% or more, more preferably 95% or more, even more preferably 99% or more, and particularly preferably 100%) of all of the defocus regions is within ±10% (preferably within ±5%, and more preferably within ±1%). Note that values falling within the above fluctuation range described in this specification are, but not limited to the description in this paragraph, "equal" or "constant". When the fluctuation range takes a positive value, the fluctuation range may be 100×(the largest value−the smallest value)/the largest value.

A profile power plot of the defocus region having a rotationally symmetric shape about an axis (the vertical axis: DSA [arcmin], the horizontal axis: the radial position [mm] from the center portion of the defocus region) may be continuous as in Examples 3 and 4, or may be discontinuous as in Example 5. Also, if the profile curve is continuous, the profile power plot may be represented by one mathematical expression as in Example 3, or may be represented by a plurality of mathematical expressions as in Example 4.

Hereinafter, a shape that is rotationally symmetrical about an axis is also referred to as a "rotationally symmetrical and aspherical shape".

<Specific Example of Eyeglass Lens>

There is no particular limitation on the arrangement of the plurality of defocus regions, and the arrangement can be determined, for example, from the viewpoint of the visibility of the defocus regions from the outside, design enhancement by the defocus regions, refractive power adjustment by the defocus regions, and the like.

Substantially circular defocus regions may be arranged in an island-like form (i.e., separated from each other without being adjacent to each other) at equal intervals in the circumferential and radial directions around the center portion of the eyeglass lens. Examples of the arrangement of the defocus regions in a plan view include an arrangement in which they are independently and discretely arranged such that the centers of the convex regions respectively match vertices of an equilateral triangle (the centers of the defocus regions are respectively arranged at vertices of a honeycomb structure).

Figure 4:
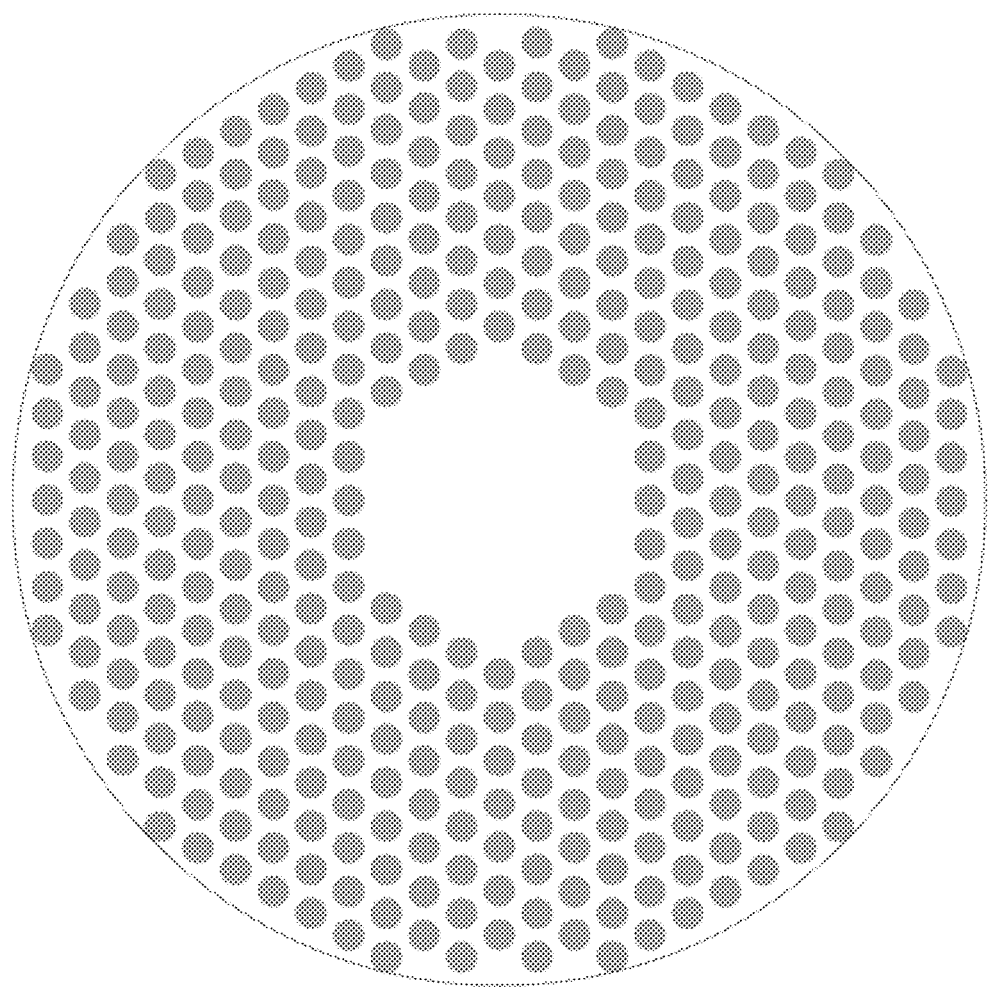
FIG. 4 is a schematic plan view showing a state in which defocus regions are independently and discretely arranged such that the centers of the defocus regions respectively match vertices of an equilateral triangle.

FIG. 4 is a schematic plan view showing a state in which defocus regions are independently and discretely arranged such that the centers of the defocus regions respectively match vertices of an equilateral triangle.

However, an aspect of the present disclosure is not limited to the contents described in Patent Document 1. That is to say, the arrangement is not limited to that in which the defocus regions are separated from each other without being adjacent to each other, and they may be in contact with each other, or may be arranged non-independently in the manner of a string of beads.

Each defocus region has, for example, the following configuration. The diameter of the defocus region is preferably approximately 0.6 to 2.0 mm. The protruding height (protrusion amount) of the defocus region is approximately 0.1 to 10 and preferably approximately 0.4 to 2.0 μm. The DSA in the defocus region is preferably set to approximately 8.0 to 20.0 arcmin.

The lens substrate is made of, for example, a thermosetting resin material such as thiourethane, allyl, acrylic, or epithio resin. As the resin material for forming the lens substrate, other resin materials that realize a desired refractive index may be selected. The lens substrate may also be made of inorganic glass instead of resin material.

A hard coating film is made of, for example, a thermoplastic or UV curable resin. The hard coating film can be formed by dipping the lens substrate in the hard coating solution or by using spin coating or other methods. This coating with the hard coating film improves the durability of the eyeglass lens.

An antireflection film is formed, for example, through vacuum deposition of an antireflective agent such as $ZrO_2$, $MgF_2$, or $Al_2O_3$. This coating with the antireflection film improves the visibility of an image through the eyeglass lens.

As described above, a plurality of defocus regions are formed on the object-side face of the lens substrate. Accordingly, when their faces are coated with the hard coating film and the antireflection film, the hard coating film and the antireflection film also form a plurality of defocus regions, following the defocus regions of the lens substrate.

To produce the eyeglass lens, first, the lens substrate is molded using a known molding method such as cast polymerization. A lens substrate having defocus regions on at least one surface is obtained by performing molding through cast polymerization using a molding die having a molding face provided with a plurality of concave portions, for example.

Once the lens substrate is obtained, a hard coating film is then formed on the surface of the lens substrate. The hard coating film can be formed by dipping the lens substrate in the hard coating solution or by using spin coating or other methods.

Once the hard coating film is obtained, an antireflection film is then formed on the surface of the hard coating film. The hard coating film can be formed through vacuum deposition of an antireflective agent.

With the production method following this procedure, it is possible to obtain an eyeglass lens in which a plurality of defocus regions protruding toward the object side are formed on the object-side face.

The thickness of each film formed through the above-described process may be, for example, in a range of 0.1 to 100 μm (preferably 0.5 to 5.0 μm, and more preferably 1.0 to 3.0 μm). However, the thickness of the films is determined according to the function required for the films, and is not limited to the ranges given as an example.

One or more films may be further formed on the films. Examples of such films include various films such as an antireflection film, a water-repellent or hydrophilic antifouling film, and an antifog film. These films can be formed using a known technique.

EXAMPLES

The following examples are provided to illustrate the present disclosure in detail. It will be appreciated that the disclosure is not limited to the following examples.

In Examples 1 and 2, the defocus regions had a spherical shape.

In Example 1, the diameter of the defocus region in a plan view was increased with the power of the defocus region kept constant (fluctuation range was 0%) in the direction from the center portion of the eyeglass lens toward the peripheral portion of the eyeglass lens. In Example 2, the power of the defocus region was increased with the diameter of the defocus region in a plan view kept constant (fluctuation range was 0%) in the direction from the center portion of the eyeglass lens toward the peripheral portion of the eyeglass lens.

In examples 3 and 4, the shape of defocus regions located in the section 1 near the center of the eyeglass lens were spherical, and the shape of defocus regions located in the sections 2 and 3 near the periphery of the eyeglass lens was rotationally symmetrical and aspherical.

In Example 3, the diameter of a defocus region in a plan view and the power at the center portion of the defocus region were constant (fluctuation range was 0%) in the direction from the center portion of the eyeglass lens toward the peripheral portion of the eyeglass lens, and a profile power plot of the defocus regions that had a rotationally symmetrical and aspherical shape was defined by one equation in each of the sections 2 and 3.

Unlike Example 3, in example 4, a profile power plot of the defocus regions that had a rotationally symmetrical and aspherical shape was defined by two equations in each of the sections 2 and 3. However, the profile power plot was continuous.

In Example 5, all of the defocus regions had a rotationally symmetrical and aspherical shape. Also, in example 5, a profile power plot of the defocus regions that had a rotationally symmetrical and aspherical shape was defined by two equations in each of the sections 1 to 3. In this case, unlike Example 4, the profile power plot was discontinuous.

Example 1

An eyeglass lens as follows was produced. Note that the eyeglass lens was constituted only by a lens substrate, and the lens substrate was not coated with other substances. The prescription power was set to S (spherical power) 0.00 D and C (cylindrical power) 0.00 D.

Diameter of lens substrate in plan view: 100 mm
Type of lens substrate: PC (polycarbonate)
Refractive index of lens substrate: 1.589
Face on which defocus regions were formed: object-side face
Shape of defocus regions in plan view: perfect circle
Arrangement of defocus regions in plan view: the defocus regions were independently and discretely arranged such that the centers of the defocus regions respectively matched vertices of an equilateral triangle (the centers of the defocus regions were respectively arranged at vertices of a honeycomb structure)
Number of convex regions in pupil diameter: 7

The above contents were the same in the examples and thus will not be described hereinafter.

Further, the following conditions were adopted in Example 1.

Shape of defocus regions: spherical
Refractive power of defocus regions: 3.50 D
Arrangement of defocus regions in plan view etc.: will be described as follows.

Within a radius of 4.00 mm from the center (centering center) of the eyeglass lens: no defocus regions were provided.

Section 1 (Ring 1): the range extending from the center to a radius of 4.00 to 9.75 mm. The diameter of the defocus regions in the ring 1 was 0.88 mm, and the interval between defocus regions was 1.20 mm, and DSA was 10.59 arcmin.

Section 2 (Ring 2): the range extending from the center to a radius of 9.75 to 15.40 mm. The diameter of the defocus regions in the ring 2 was 1.10 mm, and the interval between defocus regions was 1.50 mm, and DSA was 13.24 arcmin.

Section 3 (Ring 3): the range extending from the center to a radius of 15.40 to 19.25 mm. The diameter of the defocus regions in the ring 3 was 1.32 mm, and the interval between defocus regions was 1.80 mm, and DSA was 15.88 arcmin.

Figure 5:
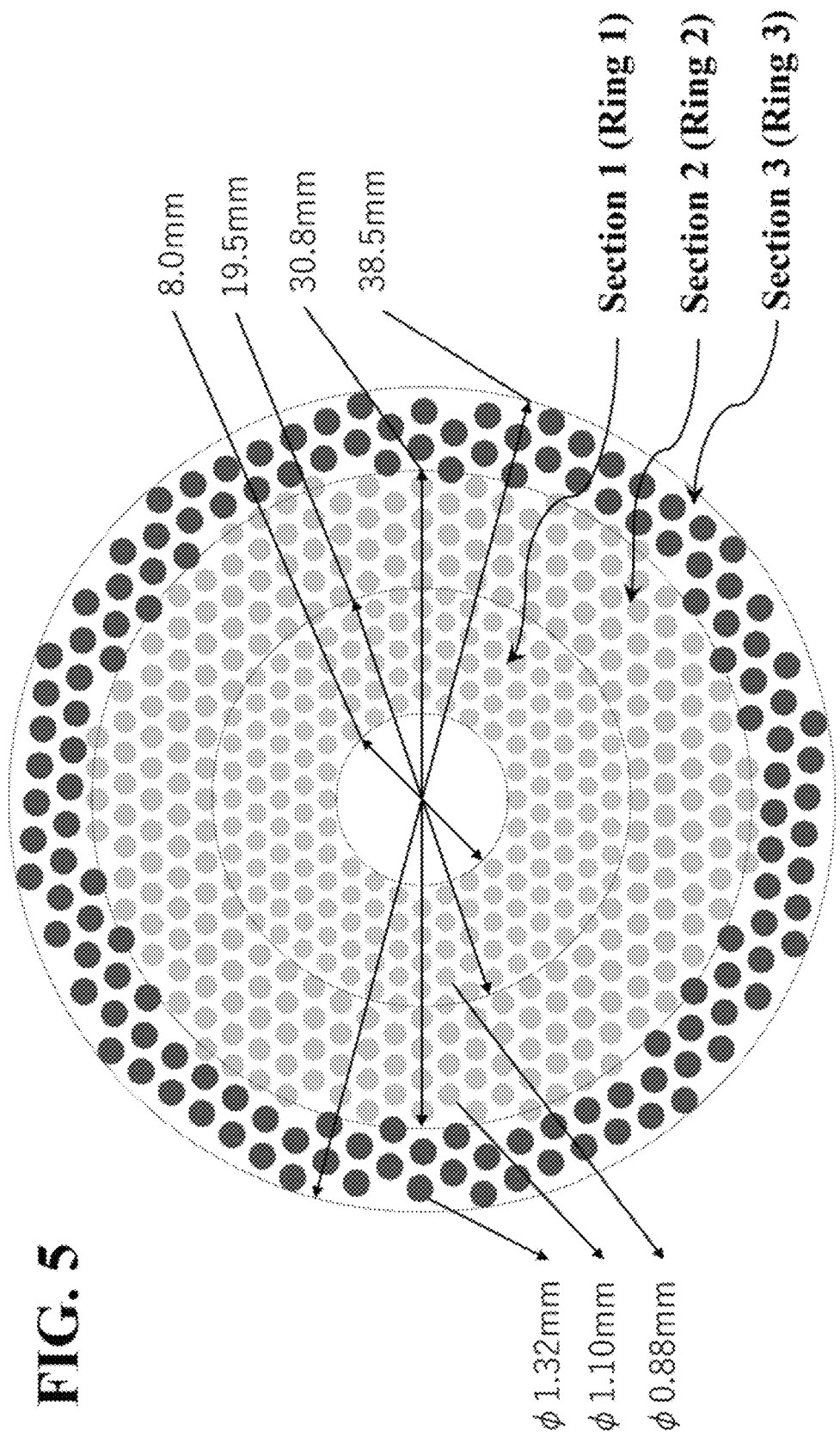
FIG. 5 is a schematic plan view showing a distribution of the defocus regions on the eyeglass lens according to Example 1.

FIG. 5 is a schematic plan view showing a distribution of the defocus regions on the eyeglass lens according to Example 1.

Example 2

The following conditions were adopted in Example 2.
Shape of defocus regions: spherical
Diameter of defocus regions: 1.1 mm
Interval between defocus regions: 1.5 mm
Arrangement of defocus regions in plan view etc.: will be described as follows.

Within a radius of 4.5 mm from the center (centering center) of the eyeglass lens: no defocus regions were provided.

Section 1 (Ring 1): the range extending from the center to a radius of 4.50 to 9.75 mm. The refractive power of the defocus regions in the ring 1 was 2.50 D, and DSA was 9.45 arcmin.

Section 2 (Ring 2): the range extending from the center to a radius of 9.75 to 13.00 mm. The refractive power of the defocus regions in the ring 2 was 3.50 D, and DSA was 13.24 arcmin.

Section 3 (Ring 3): the range extending from the center to a radius of 15.40 to 19.25 mm. The refractive power of the defocus regions in the ring 3 was 4.50 D, and DSA was 17.02 arcmin.

Figure 6:
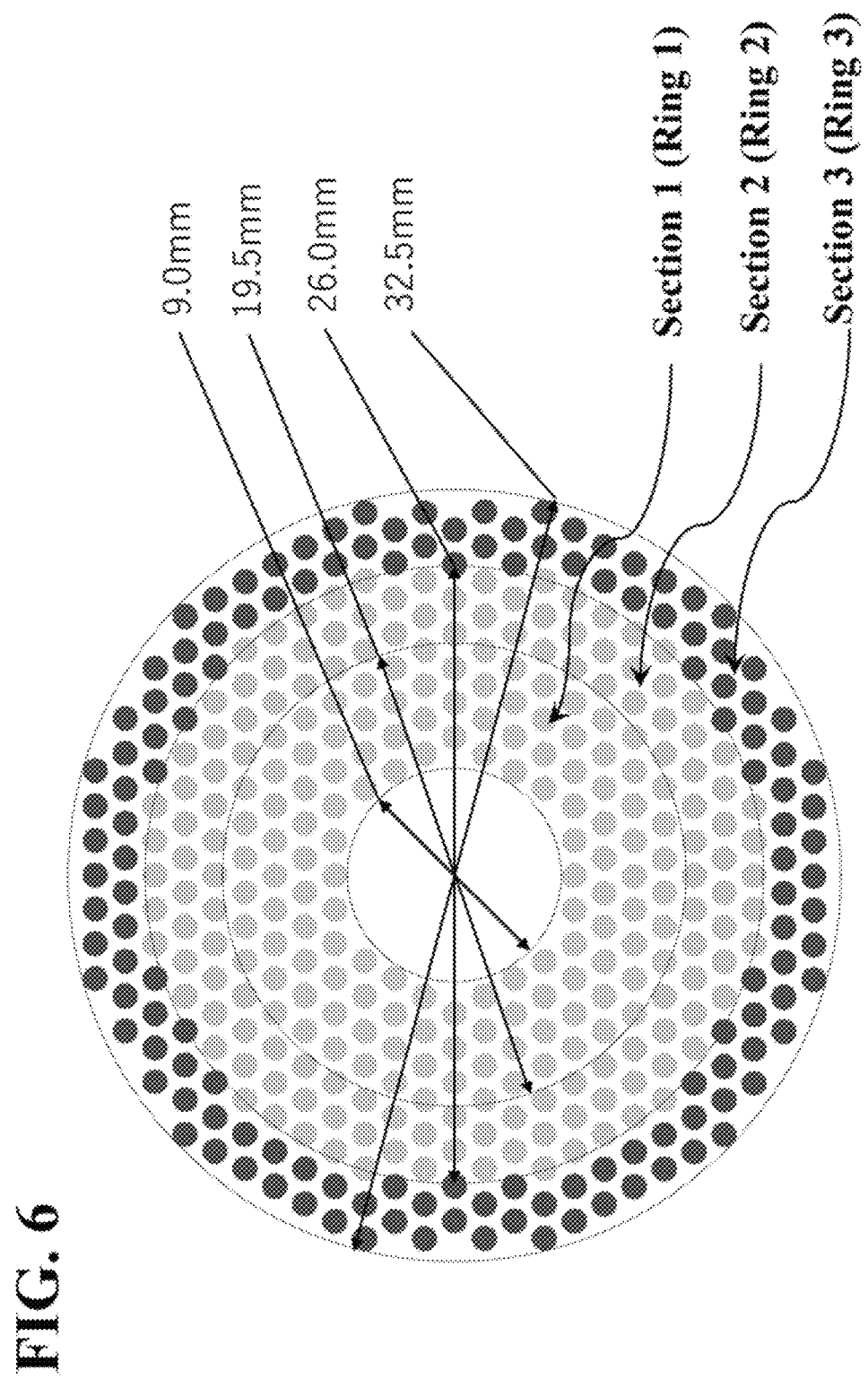
FIG. 6 is a schematic plan view showing a distribution of the defocus regions on the eyeglass lens according to Examples 2 to 5.

FIG. 6 is a schematic plan view showing a distribution of the defocus regions on the eyeglass lens according to Examples 2 to 5.

Example 3

The following conditions were adopted in Example 3.
Diameter of defocus regions: 1.1 mm
Interval between defocus regions: 1.5 mm
Arrangement of defocus regions in plan view etc.: will be described as follows.

Within a radius of 4.5 mm from the center (centering center) of the eyeglass lens: no defocus regions were provided.

Section 1 (Ring 1): the range extending from the center to a radius of 4.50 to 9.75 mm. The defocus regions had a spherical shape. The refractive power of the defocus regions was 2.50 D, and DSA was 9.45 arcmin.

Section 2 (Ring 2): the range extending from the center to a radius of 9.75 to 13.00 mm. The defocus regions had a rotationally symmetrical and aspherical shape. The refractive power at the center portion of each defocus region was 2.50 D, and DSA was 13.24 arcmin.

Section 3 (Ring 3): the range extending from the center to a radius of 15.40 to 19.25 mm. The defocus regions had a rotationally symmetrical and aspherical shape. The refractive power at the center portion of each defocus region was 2.50 D, and DSA was 17.02 arcmin.

Figure 7:
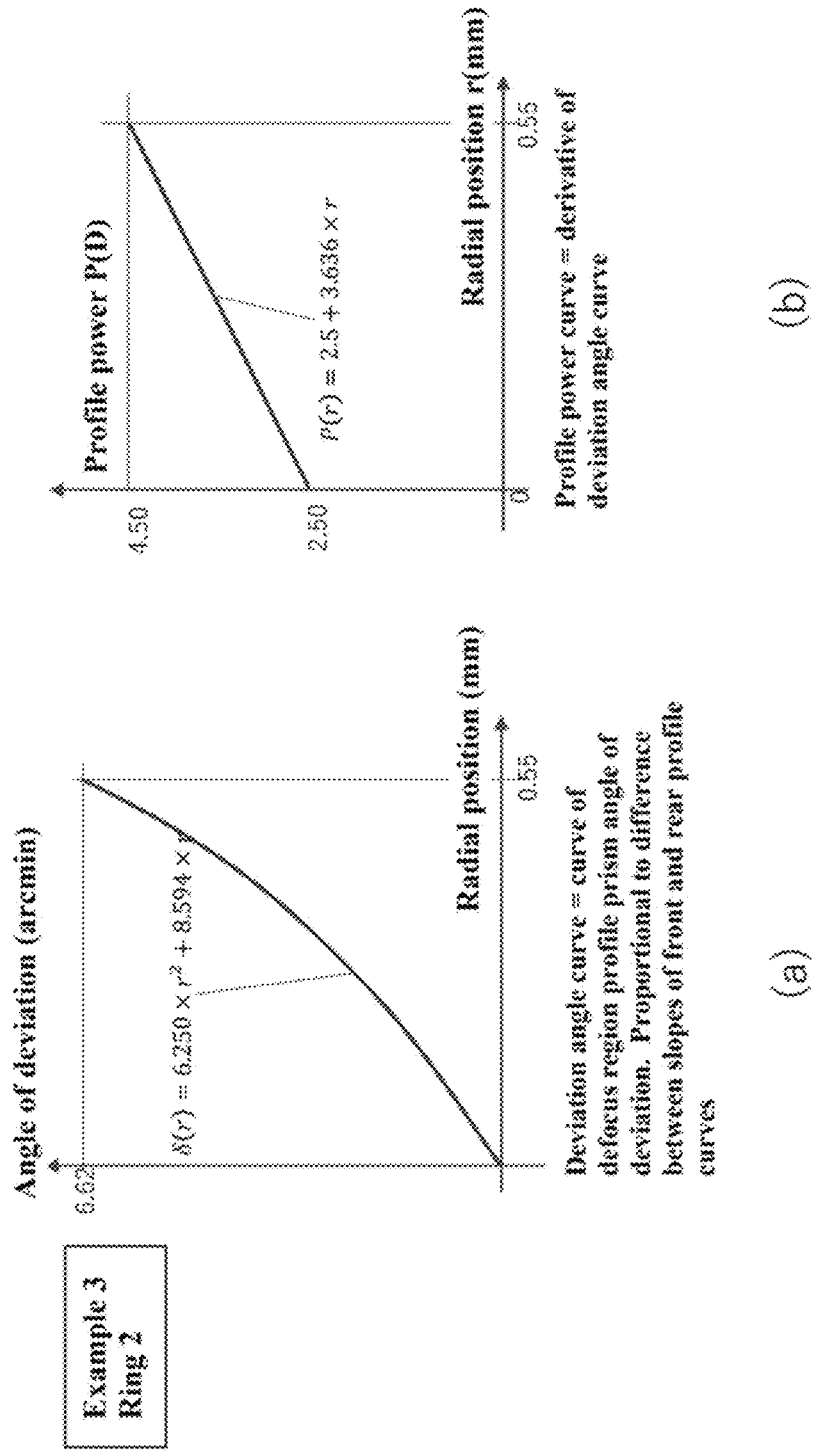
FIG. 7(a) is a graph in which the radial position r [mm] from the center portion of a defocus region of a ring 2 in Example 3 is plotted on the X axis, and the prism angle of deviation δ [arcmin] is plotted on the Y axis.
FIG. 7(b) is a graph in which the radial position r [mm] from the center portion of a defocus region of the ring 2 in Example 3 is plotted on the X axis, and the profile power P [D] is plotted on the Y axis.

FIG. 7(a) is a graph in which the radial position r [mm] from the center portion of a defocus region of the ring 2 in Example 3 is plotted on the X axis, and the prism angle of deviation δ [arcmin] is plotted on the Y axis. The relationship between the prism angle of deviation and the radial position is represented by the following equation.

$$\delta(r)=6.250 \times r^2+8.594 \times r \quad \text{[Math. 6]}$$

FIG. 7(b) is a graph in which the radial position r [mm] from the center portion of a defocus region of the ring 2 in Example 3 is plotted on the X axis, and the profile power P [D] is plotted on the Y axis. The relationship between the profile power and the radial position is represented by the following equation.

$$P(r)=2.5+3.636 \times r \quad \text{[Math. 7]}$$

Figure 8:
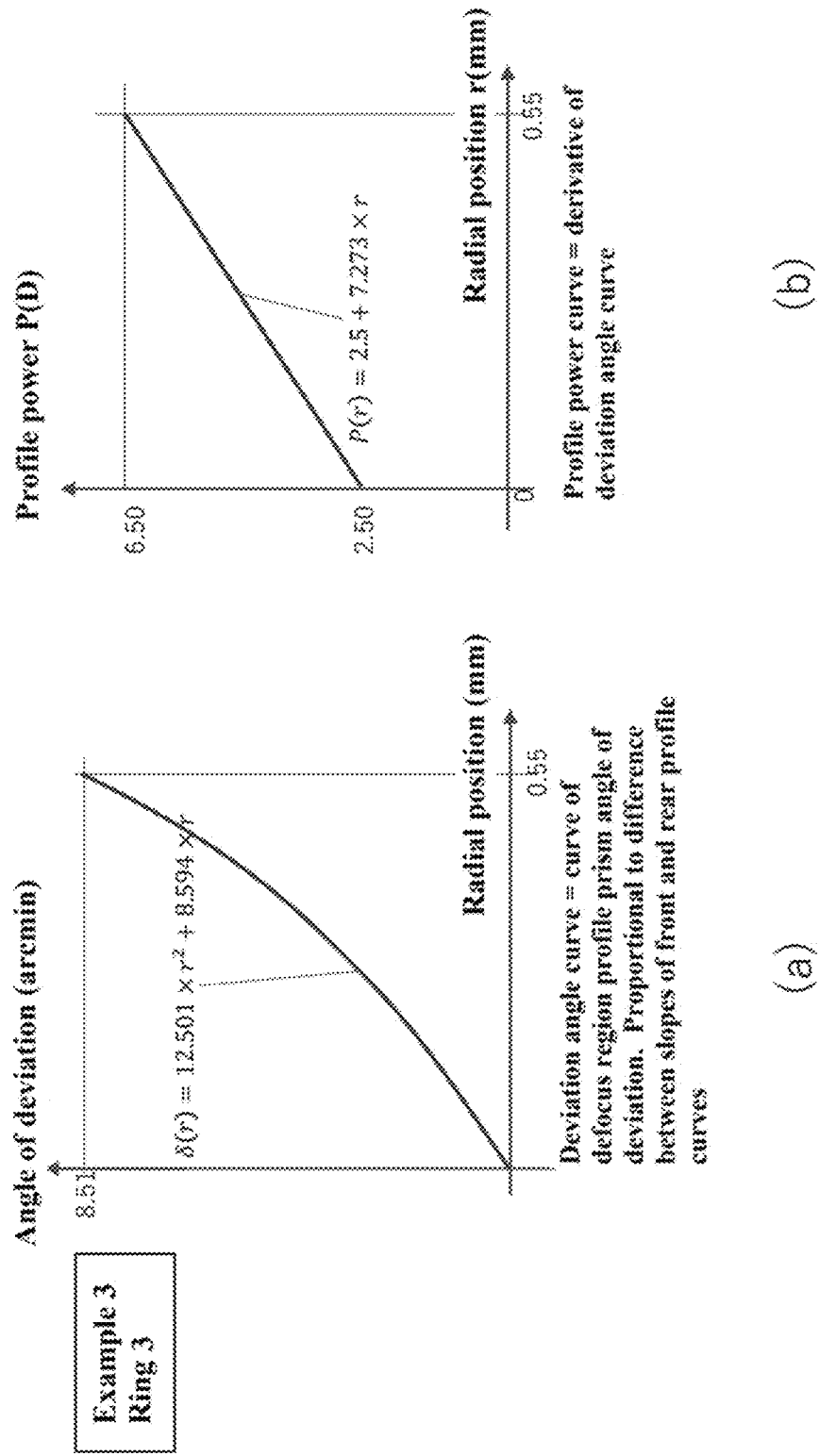
FIG. 8(a) is a graph in which the radial position r [mm] from the center portion of a defocus region of a ring 3 in Example 3 is plotted on the X axis, and the prism angle of deviation δ [arcmin] is plotted on the Y axis.
FIG. 8(b) is a graph in which the radial position r [mm] from the center portion of a defocus region of the ring 3 in Example 3 is plotted on the X axis, and the profile power P [D] is plotted on the Y axis.

FIG. 8(a) is a graph in which the radial position r [mm] from the center portion of a defocus region of the ring 3 in Example 3 is plotted on the X axis, and the prism angle of deviation δ [arcmin] is plotted on the Y axis. The relationship between the prism angle of deviation and the radial position is represented by the following equation.

$$\delta(r)=12.501 \times r^2+8.594 \times r \quad \text{[Math. 8]}$$

FIG. 8(b) is a graph in which the radial position r [mm] from the center portion of a defocus region of the ring 3 in Example 3 is plotted on the X axis, and the profile power P [D] is plotted on the Y axis. The relationship between the profile power and the radial position is represented by the following equation.

$$P(r)=2.5+7.273 \times r \quad \text{[Math. 9]}$$

Example 4

The following conditions were adopted in Example 4.
Diameter of defocus regions: 1.1 mm
Interval between defocus regions: 1.5 mm
Arrangement of defocus regions in plan view etc.: will be described as follows. The contents described in this paragraph are the same as those in Example 3.

Within a radius of 4.5 mm from the center (centering center) of the eyeglass lens: no defocus regions were provided.

Section 1 (Ring 1): the range extending from the center to a radius of 4.50 to 9.75 mm. The defocus regions had a spherical shape. The refractive power of the defocus regions was 2.50 D, and DSA was 9.45 arcmin.

Section 2 (Ring 2): the range extending from the center to a radius of 9.75 to 13.00 mm. The defocus regions had a rotationally symmetrical and aspherical shape. The refractive power at the center portion of each defocus region was 2.50 D, and DSA was 13.24 arcmin.

Section 3 (Ring 3): the range extending from the center to a radius of 15.40 to 19.25 mm. The defocus regions had a rotationally symmetrical and aspherical shape. The refractive power at the center portion of each defocus region was 2.50 D, and DSA was 17.02 arcmin.

Figure 9:
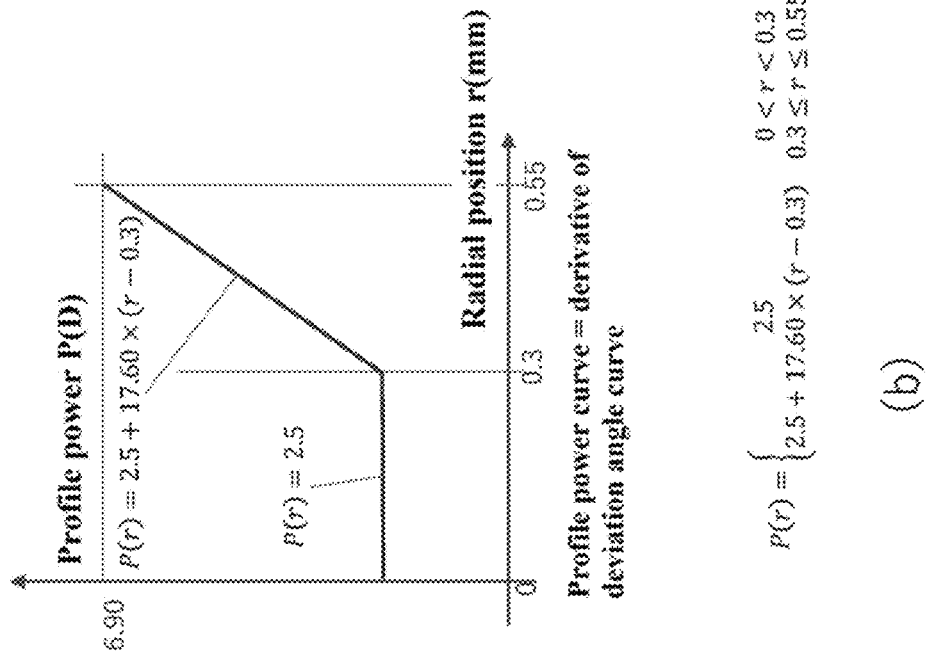
FIG. 9(a) is a graph in which the radial position r [mm] from the center portion of a defocus region of a ring 2 in Example 4 is plotted on the X axis, and the prism angle of deviation δ [arcmin] is plotted on the Y axis.
FIG. 9(b) is a graph in which the radial position r [mm] from the center portion of a defocus region of the ring 2 in Example 4 is plotted on the X axis, and the profile power P [D] is plotted on the Y axis.
Figure 9:
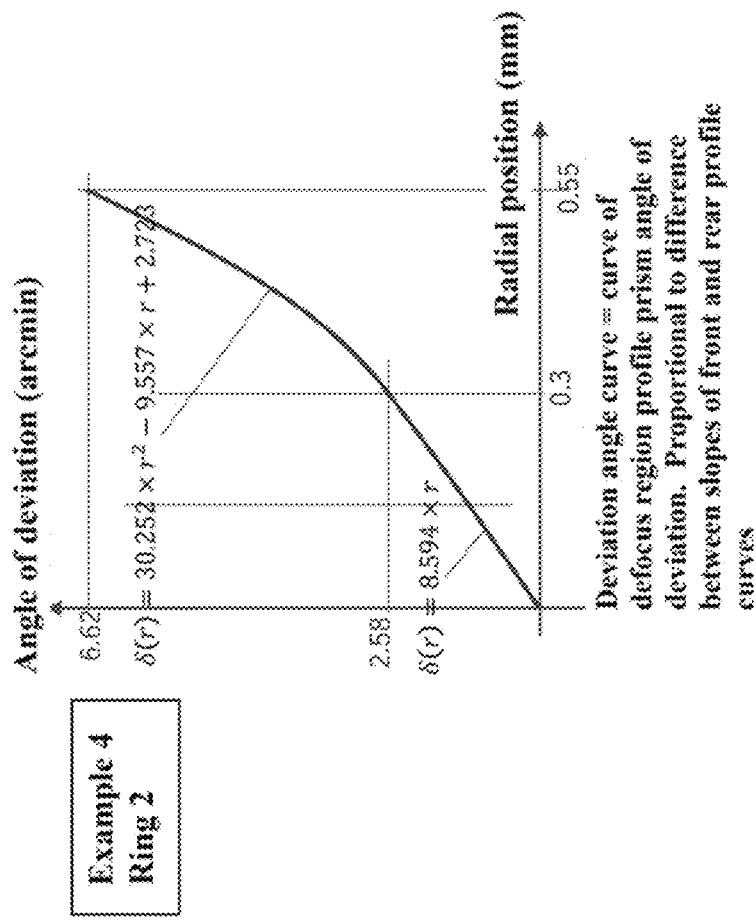

FIG. 9(a) is a graph in which the radial position r [mm] from the center portion of a defocus region of the ring 2 in Example 4 is plotted on the X axis, and the prism angle of deviation δ [arcmin] is plotted on the Y axis. The relationship between the prism angle of deviation and the radial position is represented by the following equations.

$$\delta(r) = \begin{cases} 8.594 \times r & 0 < r < 0.3 \\ 30.252 \times r^2 - 9.557 \times r + 2.723 & 0.3 \leq r \leq 0.55 \end{cases} \quad \text{[Math. 10]}$$

FIG. 9(b) is a graph in which the radial position r [mm] from the center portion of a defocus region of the ring 2 in Example 4 is plotted on the X axis, and the profile power P [D] is plotted on the Y axis. The relationship between the profile power and the radial position is represented by the following equations.

$$P(r) = \begin{cases} 2.5 & 0 < r < 0.3 \\ 2.5 + 17.60 \times (r + 0.3) & 0.3 \leq r \leq 0.55 \end{cases} \quad \text{[Math. 11]}$$

FIG. 10(a) is a graph in which the radial position r [mm] from the center portion of a defocus region of the ring 3 in Example 4 is plotted on the X axis, and the prism angle of deviation δ[arcmin] is plotted on the Y axis. The relationship between the prism angle of deviation and the radial position is represented by the following equations.

$$\delta(r) = \begin{cases} 8.594 \times r & 0 < r < 0.3 \\ 60.504 \times r^2 - 27.708 \times r + 5.445 & 0.3 \leq r \leq 0.55 \end{cases} \quad \text{[Math. 12]}$$

FIG. 10(b) is a graph in which the radial position r [mm] from the center portion of a defocus region of the ring 3 in Example 4 is plotted on the X axis, and the profile power P [D] is plotted on the Y axis. The relationship between the profile power and the radial position is represented by the following equations.

$$P(r) = \begin{cases} 25 & 0 < r < 0.3 \\ 2.5 + 35.20 \times (r - 0.3) & 0.3 \leq r \leq 0.55 \end{cases} \quad \text{[Math. 13]}$$

Example 5

The following conditions were adopted in Example 5.
Diameter of defocus regions: 1.1 mm
Interval between defocus regions: 1.5 mm
Arrangement of defocus regions in plan view etc.: will be described as follows.
Within a radius of 4.5 mm from the center (centering center) of the eyeglass lens: no defocus regions were provided.
Section 1 (Ring 1): the range extending from the center to a radius of 4.50 to 9.75 mm. The defocus regions had a rotationally symmetrical and aspherical shape. The refractive power at the center portion of each defocus region was 2.50 D, and DSA was 9.45 arcmin.
Section 2 (Ring 2): the range extending from the center to a radius of 9.75 to 13.00 mm. The defocus regions had a rotationally symmetrical and aspherical shape. The refractive power at the center portion of each defocus region was 2.00 D, and DSA was 13.24 arcmin.
Section 3 (Ring 3): the range extending from the center to a radius of 15.40 to 19.25 mm. The defocus regions had a rotationally symmetrical and aspherical shape. The refractive power at the center portion of each defocus region was 2.00 D, and DSA was 17.02 arcmin.

Note that the slope of the profile power plot in the rings 1 to 3 had at least one discontinuous point.

Figure 11:
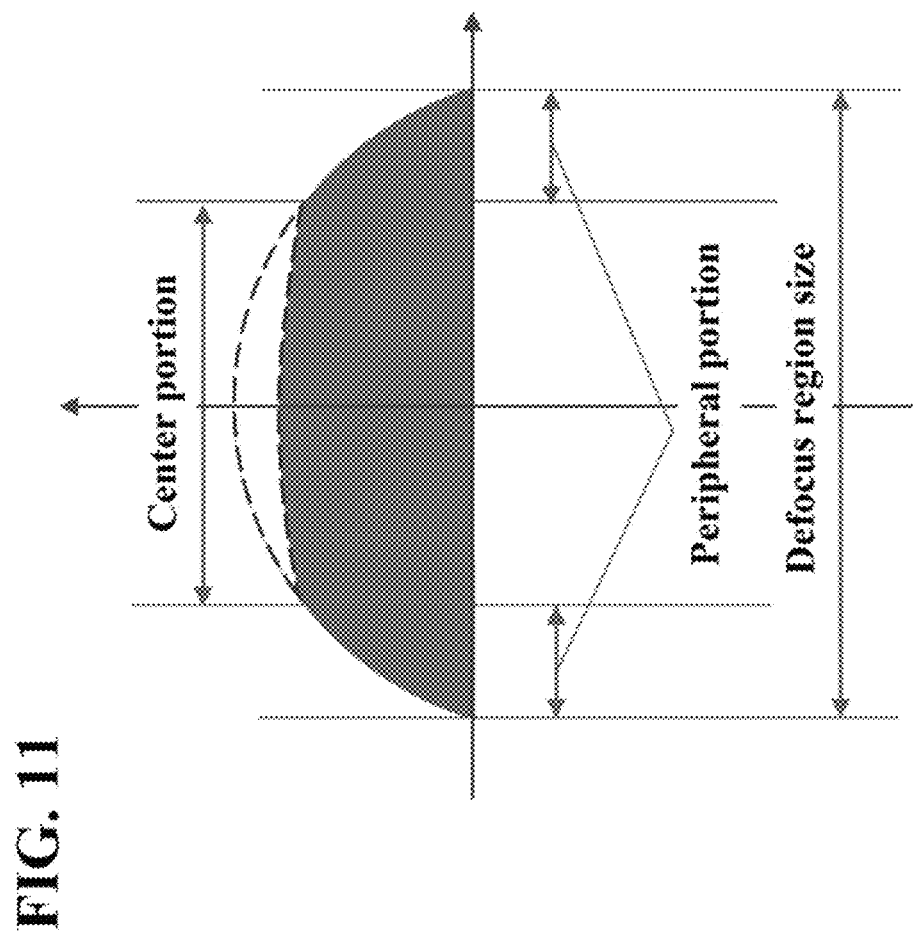
FIG. 11 is a schematic cross-sectional view of a defocus region in Example 5.

FIG. 11 is a schematic cross-sectional view of a defocus region in Example 5.

Figure 12:
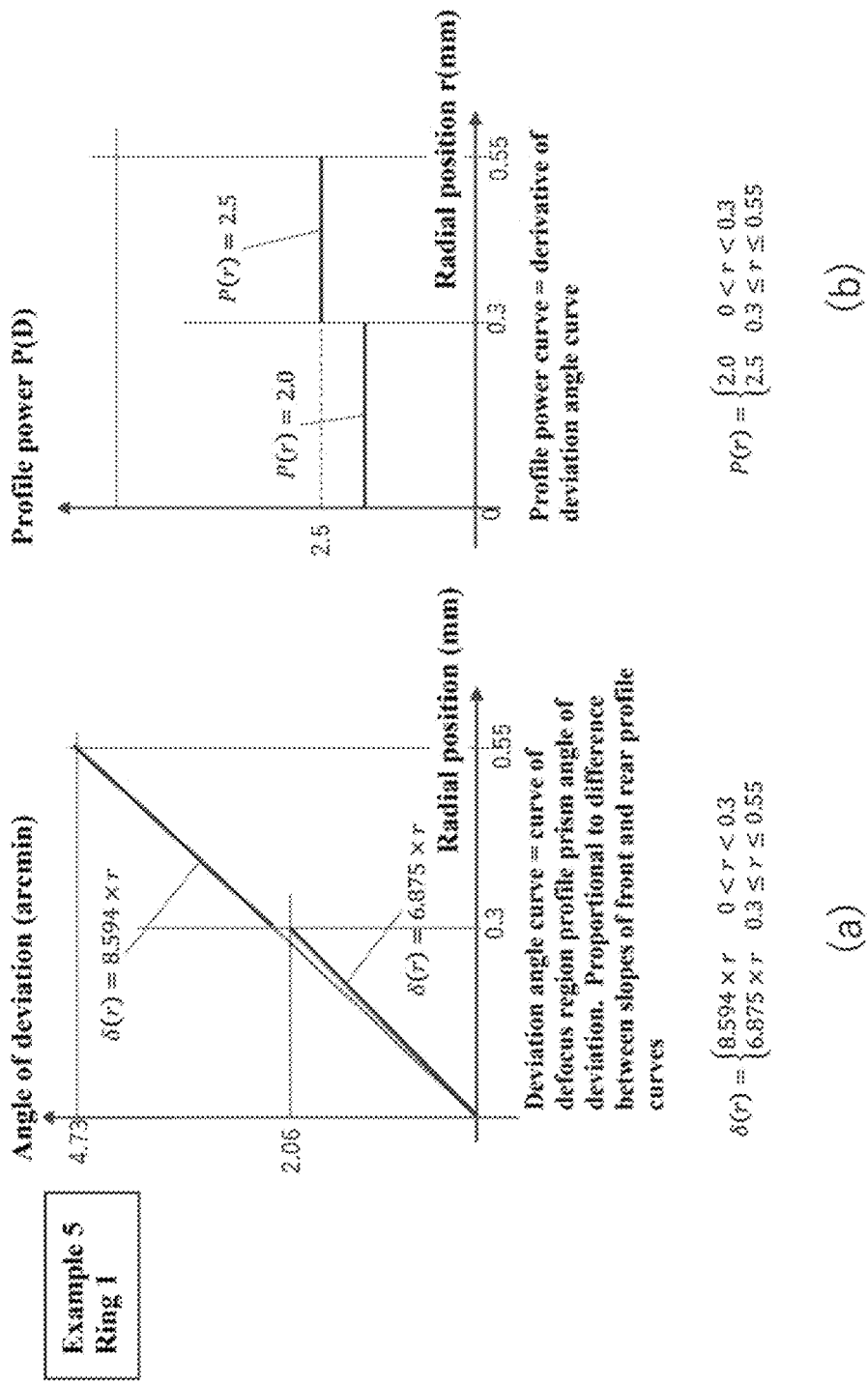
FIG. 12(a) is a graph in which the radial position r [mm] from the center portion of a defocus region of a ring 1 in Example 5 is plotted on the X axis, and the prism angle of deviation δ [arcmin] is plotted on the Y axis.
FIG. 12(b) is a graph in which the radial position r [mm] from the center portion of a defocus region of the ring 1 in Example 5 is plotted on the X axis, and the profile power P [D] is plotted on the Y axis.

FIG. 12(a) is a graph in which the radial position r [mm] from the center portion of a defocus region of the ring 1 in Example 5 is plotted on the X axis, and the prism angle of deviation δ[arcmin] is plotted on the Y axis. The relationship between the prism angle of deviation and the radial position is represented by the following equations.

$$\delta(r) = \begin{cases} 8.594 \times r & 0 < r < 0.3 \\ 6.875 \times r & 0.3 \leq r \leq 0.55 \end{cases} \quad \text{[Math. 14]}$$

FIG. 12(b) is a graph in which the radial position r [mm] from the center portion of a defocus region of the ring 1 in Example 5 is plotted on the X axis, and the profile power P [D] is plotted on the Y axis. The relationship between the profile power and the radial position is represented by the following equations.

$$P(r) = \begin{cases} 2.0 & 0 < r < 0.3 \\ 2.5 & 0.3 \leq r \leq 0.55 \end{cases} \quad \text{[Math. 15]}$$

Figure 13:
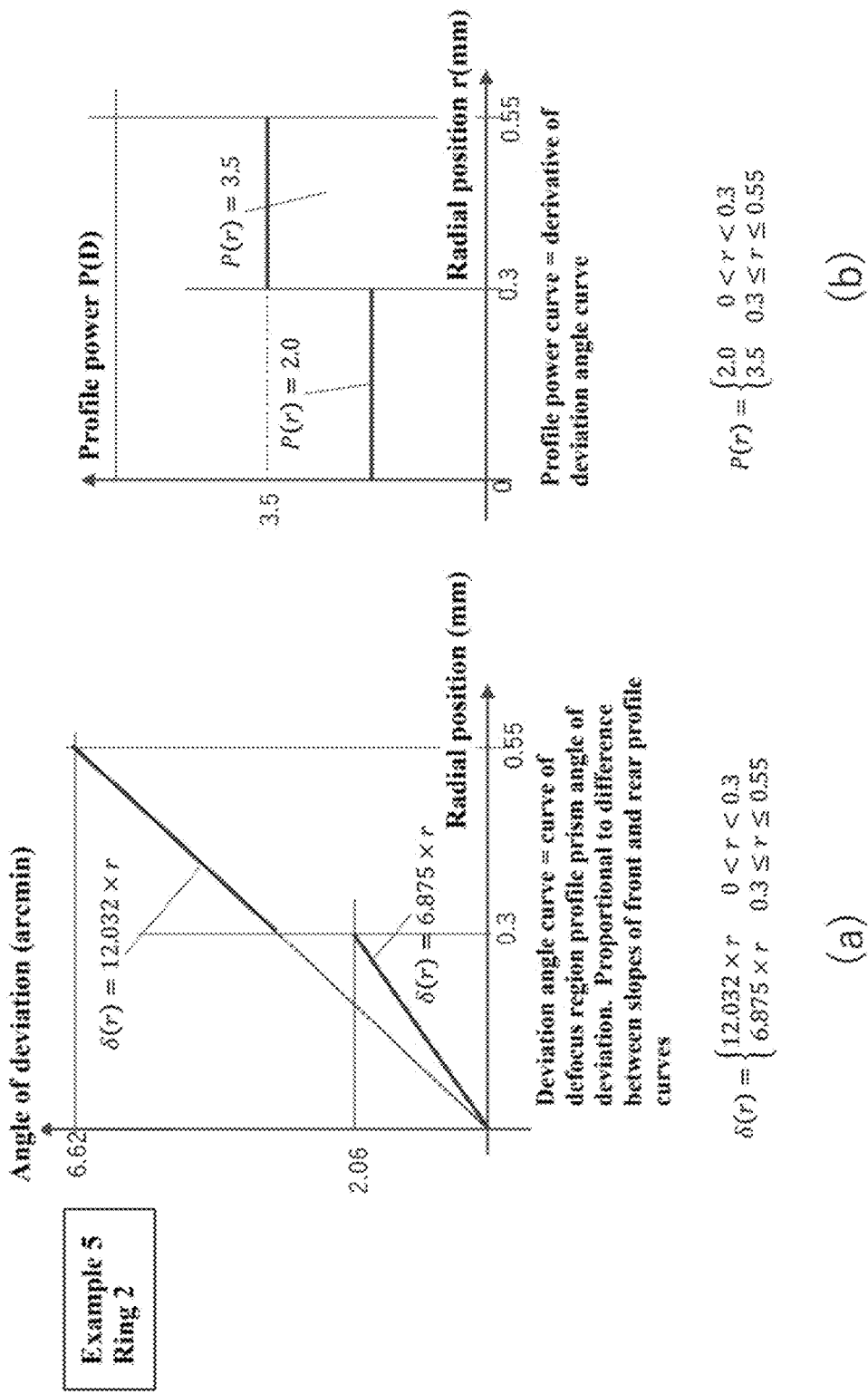
FIG. 13(a) is a graph in which the radial position r [mm] from the center portion of a defocus region of a ring 2 in Example 5 is plotted on the X axis, and the prism angle of deviation δ [arcmin] is plotted on the Y axis.
FIG. 13(b) is a graph in which the radial position r [mm] from the center portion of a defocus region of the ring 2 in Example 5 is plotted on the X axis, and the profile power P [D] is plotted on the Y axis.

FIG. 13(a) is a graph in which the radial position r [mm] from the center portion of a defocus region of the ring 2 in Example 5 is plotted on the X axis, and the prism angle of deviation δ[arcmin] is plotted on the Y axis. The relationship between the prism angle of deviation and the radial position is represented by the following equations.

$$\delta(r) = \begin{cases} 12.032 \times r & 0 < r < 0.3 \\ 6.875 \times r & 0.3 \leq r \leq 0.55 \end{cases} \quad \text{[Math. 16]}$$

FIG. 13(b) is a graph in which the radial position r [mm] from the center portion of a defocus region of the ring 2 in Example 5 is plotted on the X axis, and the profile power P [D] is plotted on the Y axis. The relationship between the profile power and the radial position is represented by the following equations.

$$P(r) = \begin{cases} 2.0 & 0 < r < 0.3 \\ 2.5 & 0.3 \leq r \leq 0.55 \end{cases} \quad \text{[Math. 17]}$$

Figure 14:
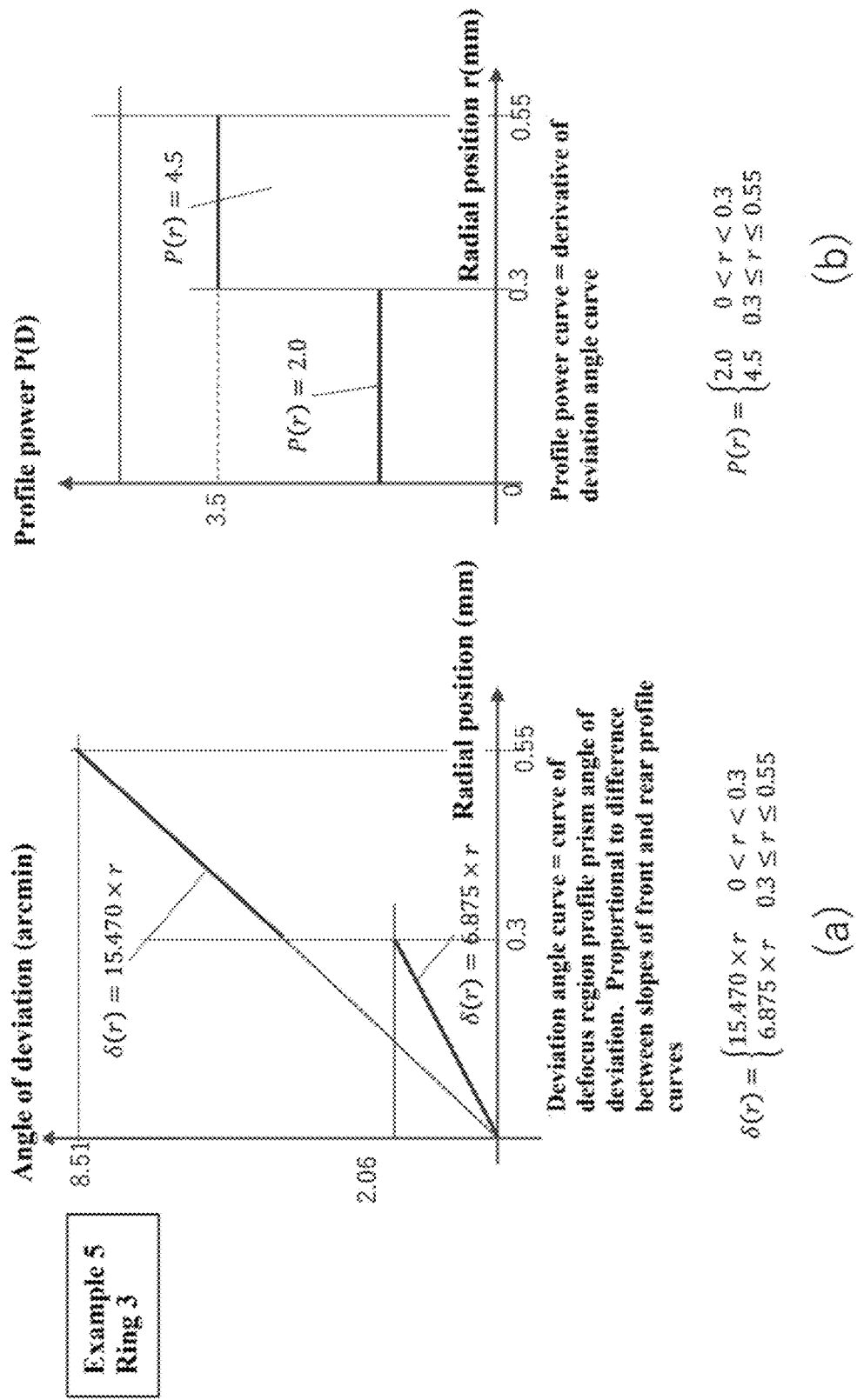
FIG. 14(a) is a graph in which the radial position r [mm] from the center portion of a defocus region of a ring 3 in Example 5 is plotted on the X axis, and the prism angle of deviation δ [arcmin] is plotted on the Y axis.
FIG. 14(b) is a graph in which the radial position r [mm] from the center portion of a defocus region of the ring 3 in Example 5 is plotted on the X axis, and the profile power P [D] is plotted on the Y axis.

FIG. 14(a) is a graph in which the radial position r [mm] from the center portion of a defocus region of the ring 3 in Example 5 is plotted on the X axis, and the prism angle of deviation δ[arcmin] is plotted on the Y axis. The relationship between the prism angle of deviation and the radial position is represented by the following equations.

$$\delta(r) = \begin{cases} 15.470 \times r & 0 < r < 0.3 \\ 6.875 \times r & 0.3 \leq r \leq 0.55 \end{cases} \quad \text{[Math. 18]}$$

FIG. 14(b) is a graph in which the radial position r [mm] from the center portion of a defocus region of the ring 3 in Example 5 is plotted on the X axis, and the profile power P

[D] is plotted on the Y axis. The relationship between the profile power and the radial position is represented by the following equations.

$$P(r) = \begin{cases} 2.0 & 0 < r < 0.3 \\ 4.5 & 0.3 \leq r \leq 0.55 \end{cases} \quad \text{[Math. 19]}$$

The invention claimed is:

1. An eyeglass lens comprising:
a base region that causes a luminous flux that has entered from an object-side face to exit from an eyeball-side face, and to enter an eye and converge on a retina; and
a plurality of defocus regions that are in contact with the base region and that are each configured such that a luminous flux that passes through at least a part of the corresponding defocus region enters the retina as diverging light,
wherein a defocus spot angle (DSA) of the luminous flux that causes a light spot having a size mainly for cones is set in a defocus region located near the center of the eyeglass lens, and a defocus spot angle (DSA) of the luminous flux that causes a light spot having a size mainly for rods is set in a defocus region located near a periphery of the eyeglass lens.

2. The eyeglass lens according to claim 1,
wherein the DSA of the defocus regions increases in a direction from a center portion of the eyeglass lens toward a peripheral portion of the eyeglass lens.

3. The eyeglass lens according to claim 1,
wherein the DSA of the defocus regions changes in a range of 5.0 to 50.0 arcmin in a direction from a center portion of the eyeglass lens toward a peripheral portion of the eyeglass lens.

4. The eyeglass lens according to claim 1,
wherein defocus powers at the centers of 80% or more of all of the defocus regions are equal to each other on the eyeglass lens, and the defocus regions increase in size from a center portion of the eyeglass lens toward a peripheral portion of the eyeglass lens.

5. The eyeglass lens according to claim 1,
wherein the sizes of 80% or more of all of the defocus regions are equal to each other on the eyeglass lens, and defocus powers increase from a center portion of the eyeglass lens toward a peripheral portion of the eyeglass lens.

6. The eyeglass lens according to claim 1,
wherein at least one of all of the defocus regions is rotationally symmetric about an axis, and
a refractive power increases from a center portion toward a peripheral portion in the at least one defocus region that is rotationally symmetric about an axis.

7. The eyeglass lens according to claim 1,
wherein refractive powers at center portions of 80% or more of all of the defocus regions are equal to each other.

8. The eyeglass lens according to claim 1,
wherein the eyeglass lens is a myopia progression suppressing lens.

9. The eyeglass lens according to claim 2,
wherein the DSA of the defocus regions changes in a range of 5.0 to 50.0 arcmin in a direction from a center portion of the eyeglass lens toward a peripheral portion of the eyeglass lens.

10. The eyeglass lens according claim 9,
wherein defocus powers at the centers of 80% or more of all of the defocus regions are equal to each other on the eyeglass lens, and the defocus regions increase in size from a center portion of the eyeglass lens toward a peripheral portion of the eyeglass lens.

11. The eyeglass lens according claim 10,
wherein the sizes of 80% or more of all of the defocus regions are equal to each other on the eyeglass lens, and defocus powers increase from a center portion of the eyeglass lens toward a peripheral portion of the eyeglass lens.

12. The eyeglass lens according to claim 11,
wherein at least one of all of the defocus regions is rotationally symmetric about an axis, and
a refractive power increases from a center portion toward a peripheral portion in the at least one defocus region that is rotationally symmetric about an axis.

13. The eyeglass lens according to claim 12,
wherein refractive powers at center portions of 80% or more of all of the defocus regions are equal to each other.

14. The eyeglass lens according claim 13,
wherein the eyeglass lens is a myopia progression suppressing lens.

* * * * *